Dec. 7, 1937.  J. D. LEWIS ET AL  2,101,146
CONTROL SYSTEM
Filed June 15, 1936  10 Sheets-Sheet 2

Jacob Daniel Lewis
Harold Waters  } INVENTORS
Otto Albert Krauer
BY  Mathew P Bradley  ATTORNEY Dec. 7, 1937.   J. D. LEWIS ET AL   2,101,146
CONTROL SYSTEM
Filed June 15, 1936   10 Sheets-Sheet 3

Jacob Daniel Lewis
Harold Waters                INVENTORS
Otto Albert Kramer
BY Walter E. Bradley   ATTORNEY Dec. 7, 1937.  J. D. LEWIS ET AL  2,101,146
CONTROL SYSTEM
Filed June 15, 1936    10 Sheets-Sheet 6

Dec. 7, 1937.  J. D. LEWIS ET AL  2,101,146
CONTROL SYSTEM
Filed June 15, 1936    10 Sheets-Sheet 7

Dec. 7, 1937. J. D. LEWIS ET AL 2,101,146
CONTROL SYSTEM
Filed June 15, 1936 10 Sheets-Sheet 9

Jacob Daniel Lewis
Harold Waters
Otto Albert Kramer } INVENTORS

BY [signature] ATTORNEY

Dec. 7, 1937.   J. D. LEWIS ET AL   2,101,146
CONTROL SYSTEM
Filed June 15, 1936   10 Sheets-Sheet 10

Jacob Daniel Lewis
Harold Waters     } INVENTORS
Otto Albert Krauer

BY [signature]   ATTORNEY

Patented Dec. 7, 1937

2,101,146

UNITED STATES PATENT OFFICE 2,101,146

CONTROL SYSTEM

Jacob Daniel Lewis, Yonkers, N. Y., Harold Waters, Hohokus, N. J., and Otto Albert Krauer, Yonkers, N. Y., assignors to Otis Elevator Company, New York, N. Y., a corporation of New Jersey Application June 15, 1936, Serial No. 85,288

34 Claims. (Cl. 172—152)

The invention relates to control systems and especially to control systems for elevators.

In elevator installations it is desirable that acceleration and retardation of the elevator car be effected smoothly and in a minimum of time, consistent with the comfort and safety of the passengers. Installations in which current to a direct current elevator hoisting motor is supplied by a variable voltage direct current generator are particularly suitable for this purpose as advantage may be taken of the time constant of the generator field to smooth out the accelerating and retarding operations. The invention is especially directed to systems of this character.

It is the object of the invention to effect acceleration and retardation of a motor smoothly and at a suitable rate.

The invention involves starting the motor by establishing the polarity of the generator from an external source of excitation and accelerating the motor by building up the generator voltage by self-excitation. The invention further involves slowing down the motor by creating a magnetizing force to oppose that producing the self-excitation. The invention also involves utilizing the external excitation to provide slow speed operation of the motor after it has been slowed down.

In carrying out the invention, the generator is provided with a separately excited field winding, a shunt field winding and a demagnetizing field winding. To start the car, the separately excited field winding is connected to an external source of current. This establishes the polarity of the generator and starts the car in a direction in accordance with the polarity established. The amount of excitation thus produced is sufficient to cause the car to run at slow speed. When the generator polarity has been definitely established, the shunt field winding is connected across the generator armature and the generator builds up its voltage to full value by self-excitation. This provides smooth acceleration of the car to full speed. To slow down the car, the demagnetizing field winding is connected across the generator armature to provide a magnetizing force which opposes that due to the shunt field winding. This causes a gradual reduction in generator voltage and speed of the elevator car. Upon generator voltage being reduced to a low value, the shunt field winding and demagnetizing field winding are disconnected from across the generator armature and the excitation of the generator for slow speed operation is provided by the separately excited field winding.

The control system is arranged so that connection of the shunt field winding across the generator armature in starting is prevented until a generator voltage has been definitely established which is in accordance with the direction of current flow through the separately excited field winding. The generator is preferably provided also with a series field winding and the control system is arranged so that the series field winding is rendered ineffective in starting until the proper generator polarity has been definitely established.

A general idea of the invention, the mode of carrying it out which is at present preferred, and the various features and advantages thereof will be gained from the above statements. Other features and advantages of the invention will be apparent from the following description and appended claims.

In the drawings:—

Figure 10:
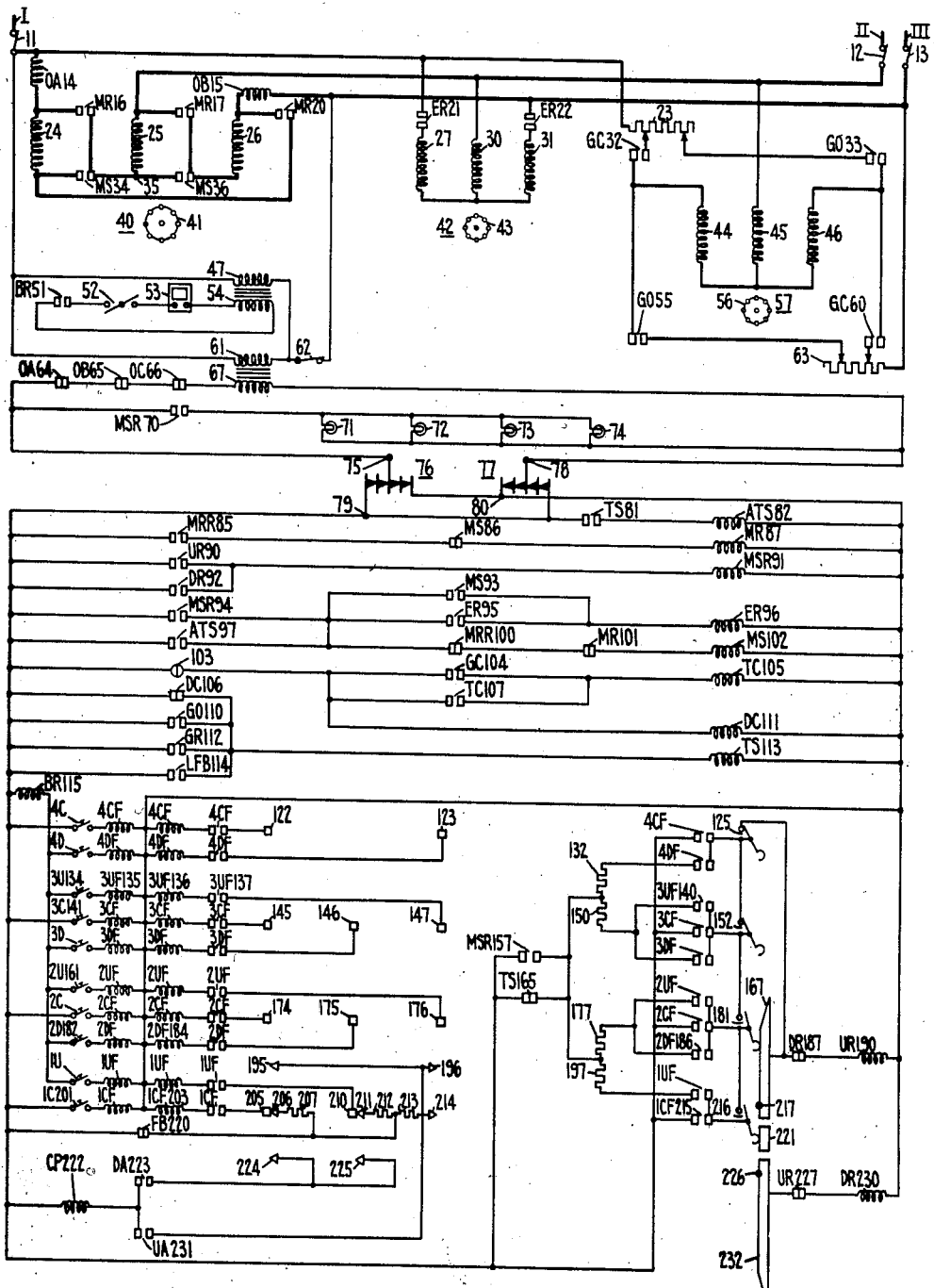
Figure 10A:
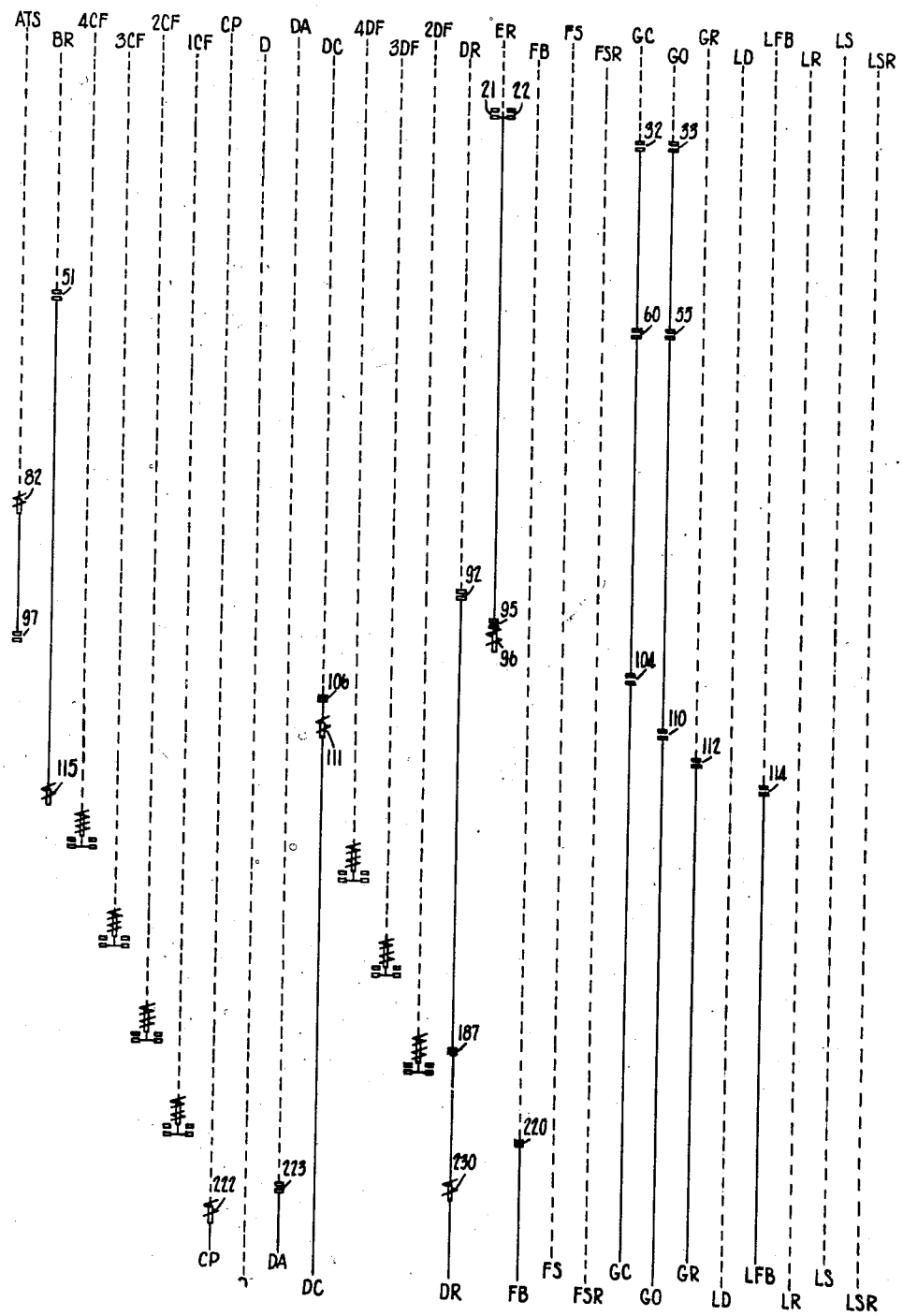
Figure 10B:
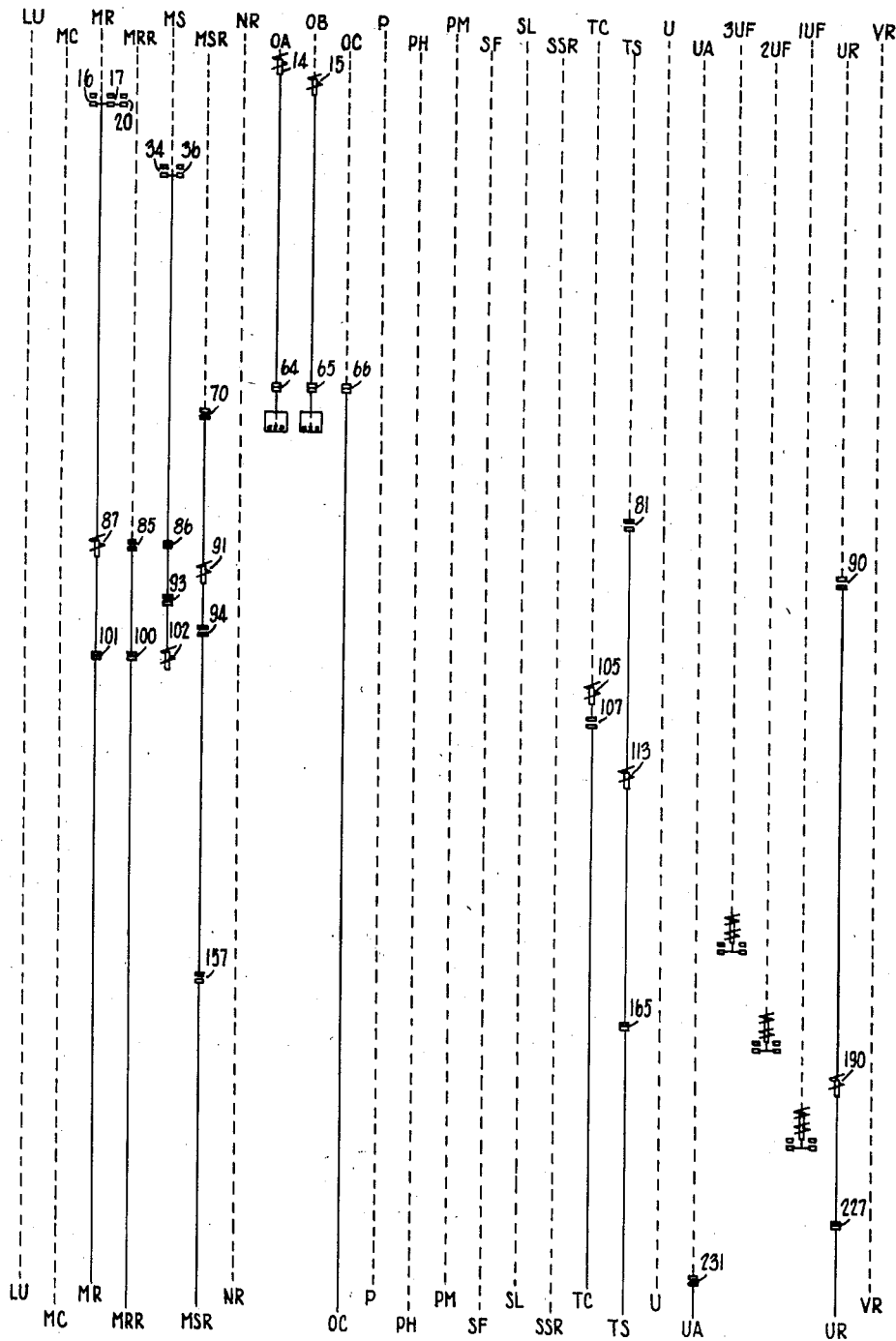
Figure 11:
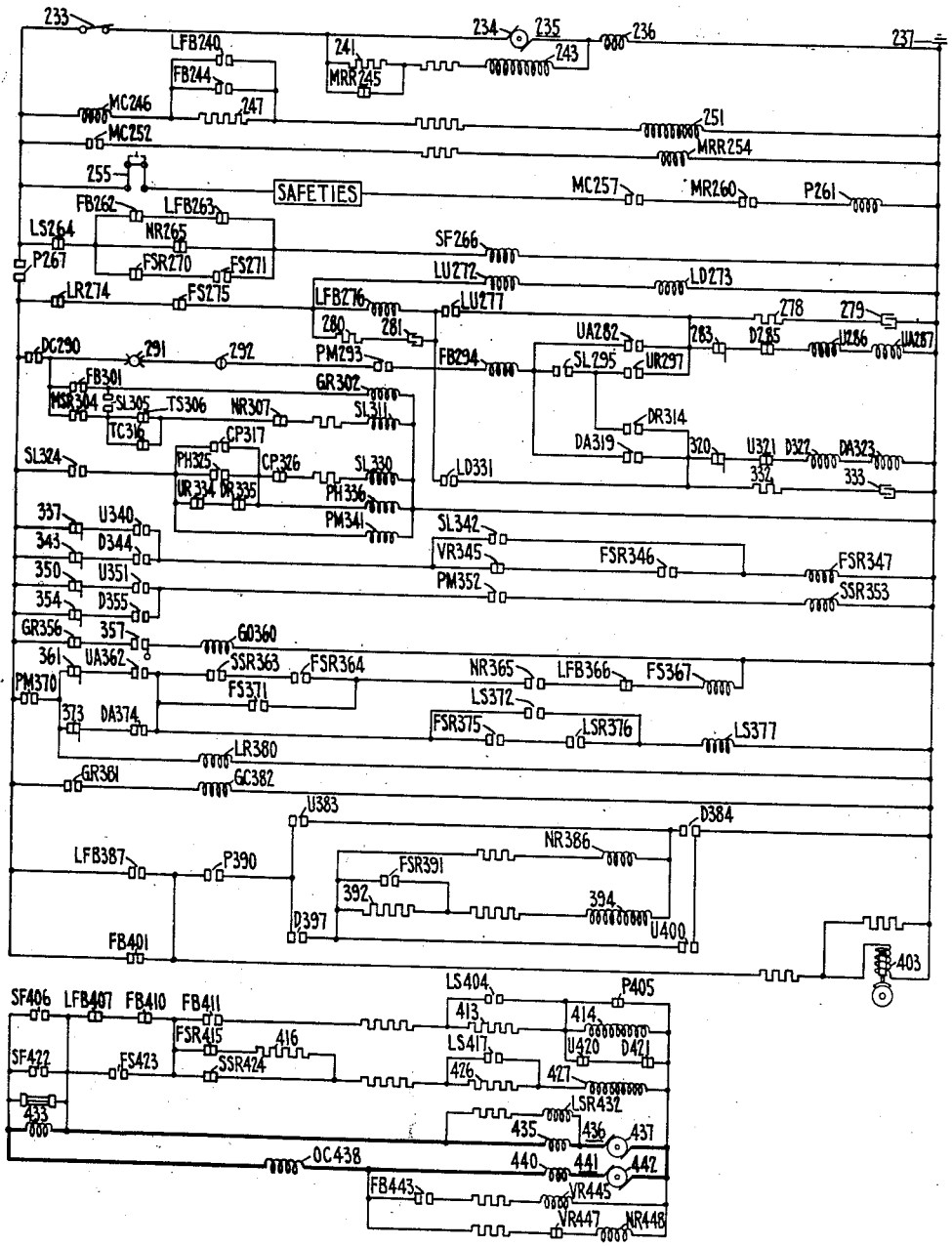
Figure 11A:
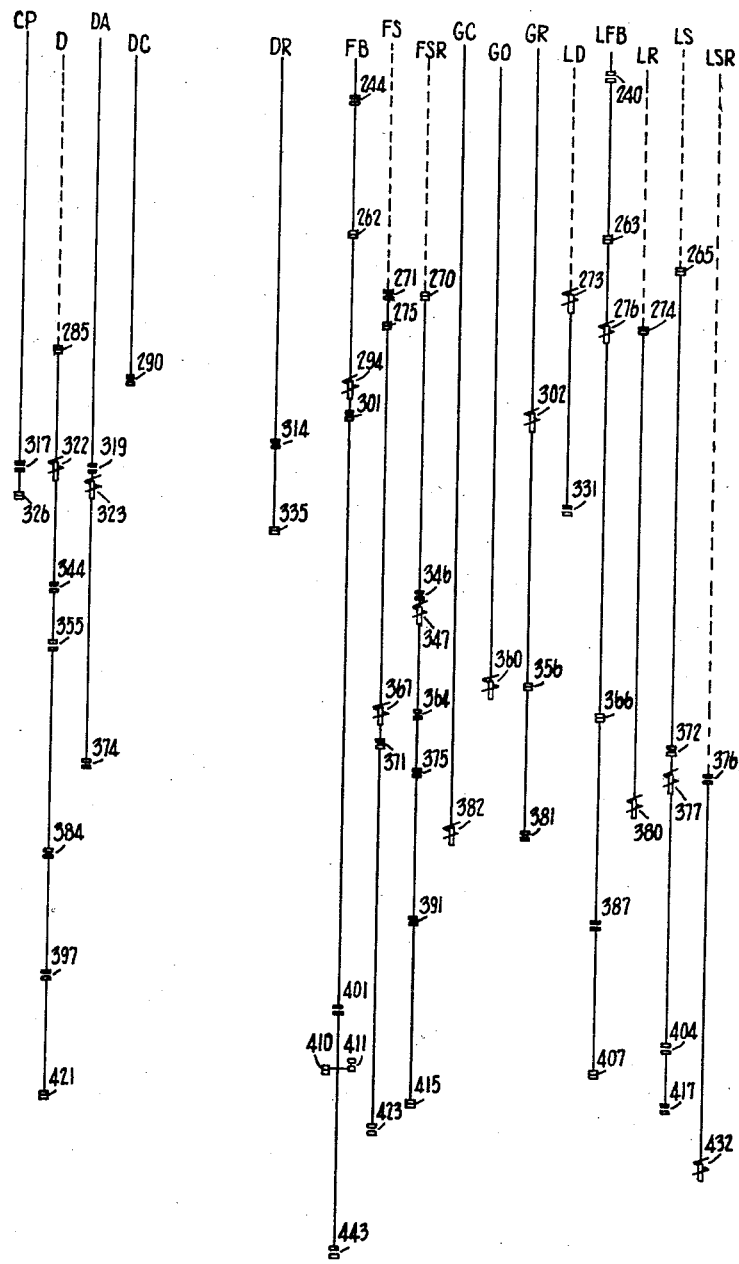
Figure 11B:
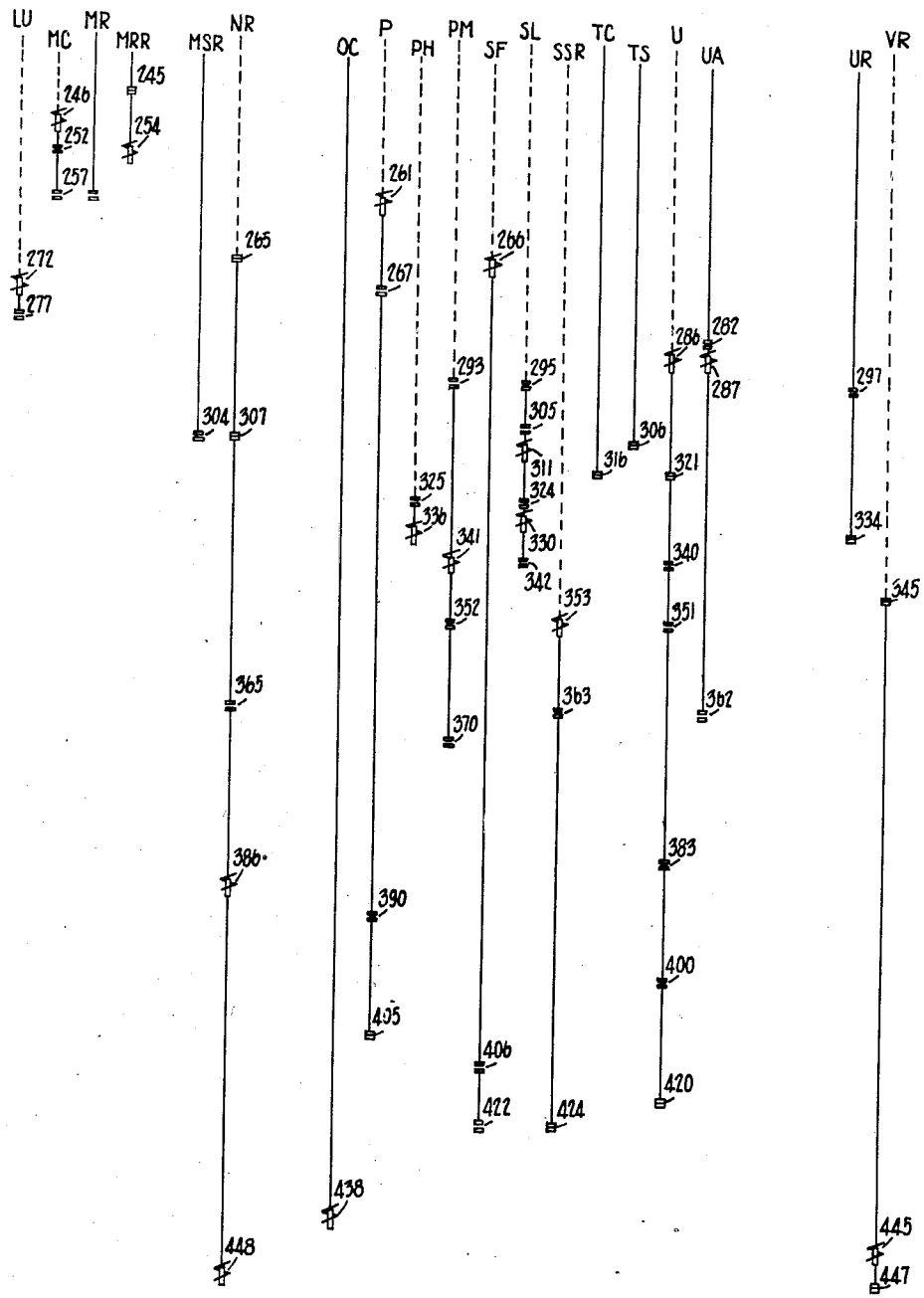

Figures 10 and 11 constitute a simplified wiring diagram of an elevator control system chosen to illustrate the principles of the invention; and Figures 10a and 10b and 11a and 11b are key sheets for Figures 10 and 11 respectively, showing the electromagnetic switches in spindle form with the contacts and coils arranged on the spindles in horizontal alignment with the corresponding contacts and coils in the wiring diagrams.

Referring first to Figures 10 and 11, which illustrate the various circuits diagrammatically, no attempt is made in these figures to show the coils and contacts of the switches in their associated positions, "straight" diagrams being employed, wherein the coils and contacts of the various switches are separated in such manner as to render the circuits involved relatively simple. Numerals employed in designating the various elements of the circuits are arranged in sequence in these diagrams, the lowest numeral 11, which indicates one blade of the main line switch, occurring in the upper left hand corner of Figure 10, with the succeeding numbers following in numerical sequence from left to right downwardly of the sheet of drawings. The numbers continue in the same way in Figure 11. The arrangement of the numerals in this sequence facilitates the location of any element referred to in the description.

The invention is applicable to installations having either alternating or direct current power supply. A three-phase alternating current power supply has been illustrated in which the supply mains are designated I, II and III. The blades of the main line switch for connecting the system to the supply mains are designated 11, 12 and 13.

Figure 1:
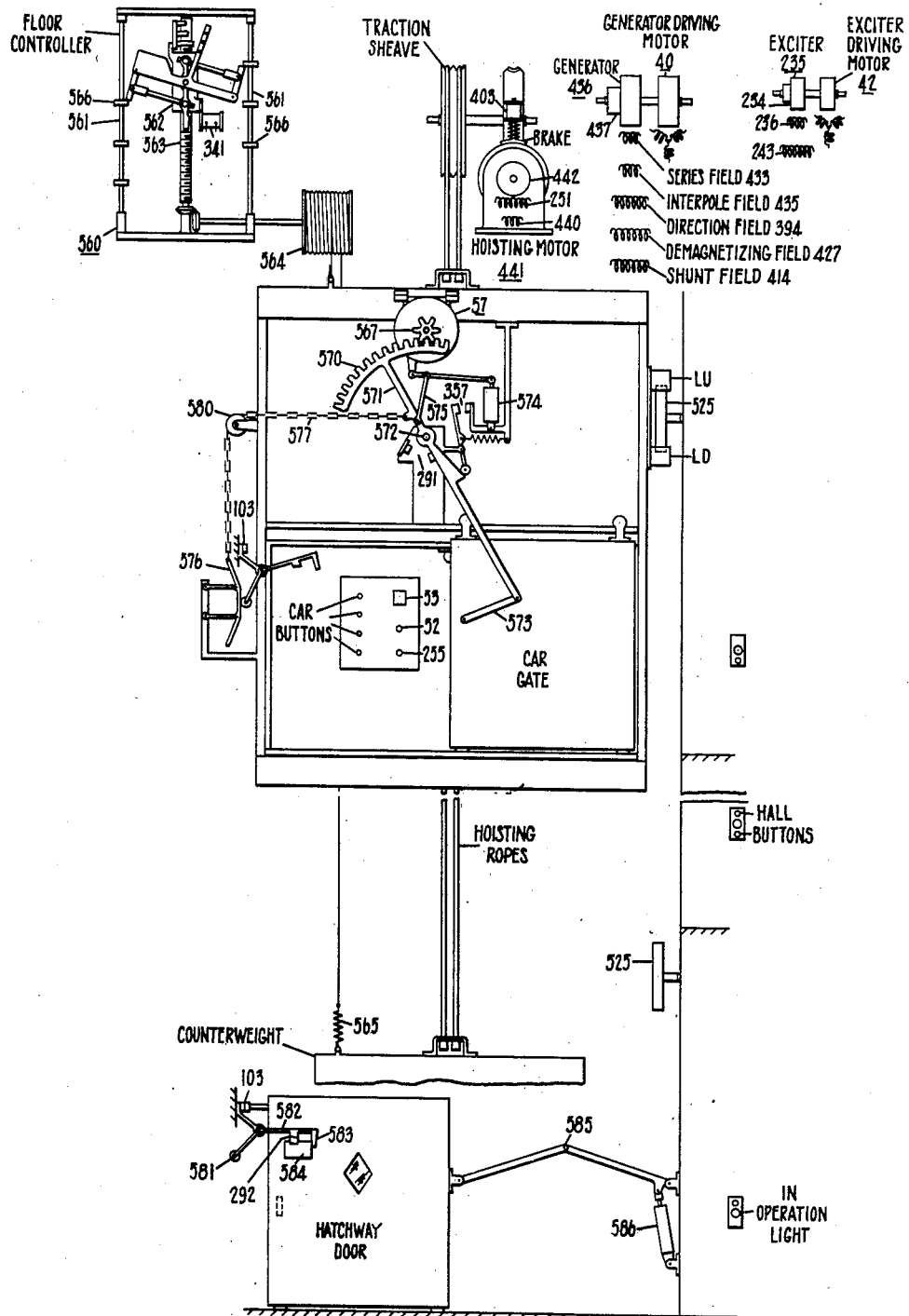
Figure 1 is a simplified schematic representation of an elevator installation embodying the invention.

Referring also to Figure 1, the variable voltage direct current generator 436 is driven by driving motor 40. The driving motor is supplied with power from the alternating current supply mains and is illustrated as a three-phase squirrel cage induction motor. The rotor of the driving motor is designated 41 and its stator windings 24, 25 and 26. The armature of the generator is designated 437, its interpole field winding 435, its series field winding 433, its shunt field winding 414, its demagnetizing field winding 427 and its separately excited or direction field winding 394. The demagnetizing field winding is preferably arranged on the same field poles as the shunt field winding. This provides a close magnetic coupling between them. Full operating voltage of the generator will be assumed to be 150 volts.

The elevator motor is designated as a whole by the numeral 441, its armature being designated 442, its interpole field winding 440 and its separately excited field winding 251. This motor is illustrated in Figure 1 as acting through reduction gearing to drive a traction sheave over which pass the hoisting ropes for raising and lowering the elevator car and counterweight. 403 is the release coil for the elevator motor electromechanical brake.

The generator direction field winding 394, elevator motor field winding 251, the brake release coil and the coils of certain of the electromagnetic switches are supplied with current from an exciter generator 235. The armature of the exciter is designated 234, its shunt field winding 243 and its series field winding 236. The exciter is grounded at 237. The exciter is preferably driven by the separate driving motor 42. This motor also is supplied with power from the alternating current supply mains and is illustrated as a three-phase squirrel cage induction motor. Its rotor is designated 43 and its stator windings 27, 30 and 31.

Current for the coils of certain other electromagnetic switches, principally those for controlling the motor generator set and the exciter set, is derived from the alternating current supply mains. In the system illustrated in Figures 10 and 11, a rectifier is interposed between the supply mains and the switches to permit direct current switches to be employed. Two half-wave dry plate rectifiers 76 and 77 are shown, these rectifiers being illustrated as connected in Wheatstone bridge relation to provide full wave rectification. The inlet terminals for the rectifiers are designated 75 and 78, while the outlet terminals are designated 79 and 80. A transformer is interposed between the rectifiers and the alternating current supply mains to obtain the desired value of operating voltage for the switches. The primary of this transformer is designated 61, while the secondary is designated 67.

For illustrating the principles of the invention, a system of elevator control has been illustrated in which the slow down and stopping of the car at the various floors is automatic. As regards the final stopping operation, the system is illustrated as including mechanism for bringing the car to an exact landing level regardless of whether it underruns or overruns the floor. This levelling mechanism is illustrated as of the type in which electromagnetic switching mechanism carried by the car is operated by being brought under the influence of a magnetizable plate in the hatchway, one for each floor. The electromagnetic switching mechanism comprises an up levelling switch and a down levelling switch mounted in spaced relation on the car, as indicated in Figure 1, to cooperate with this same magnetic plate.

Figure 2:
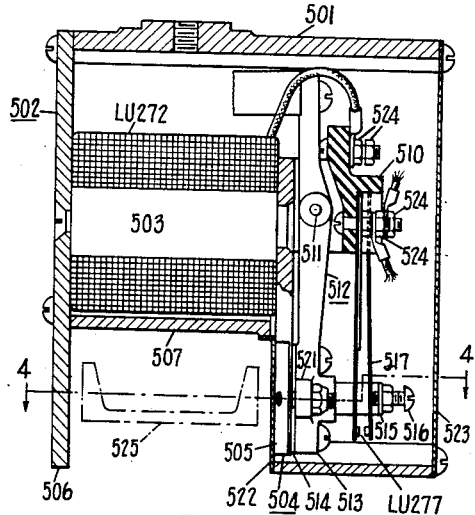
Figure 2 is a top view of a levelling switch employed in the control system chosen to illustrate the invention, parts being shown in section.
Figure 3:
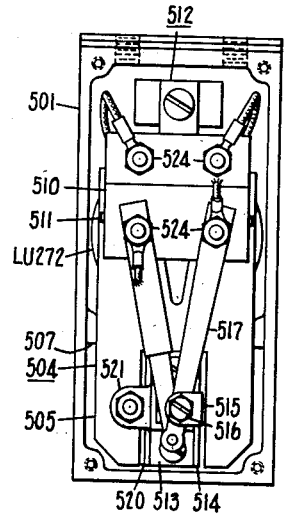
Figure 3 is an end view of the same.
Figure 4:
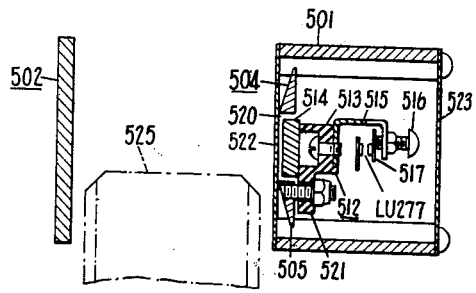
Figure 4 is a view in section taken along the line 4—4 of Figure 2.

The levelling switches are of the same construction, one of them being illustrated in Figures 2, 3, and 4, of which Figure 2 is a plan view. It comprises a housing 501 of non-magnetic material, such as bronze, having a back plate 502 of magnetizable material secured thereto. Secured to this plate, as by a screw, is the core 503 for electromagnet coil 272. On the other end of the core is secured a front plate 504 of magnetizable material. The ends 505 and 506 of the front and back plates respectively extend beyond wall 507 of the housing to form a pocket to receive the hatchway plates.

Secured to front plate 504 is a bracket 510 of insulating material. A vertical pin 511, extending between the top and bottom of the bracket, pivotally supports a horizontal lever 512, also of insulating material. One end 513 of the lever carries an armature 514 of magnetizable material which is arranged to extend into a slot provided in the extended end 505 of front plate 504. On the other end of lever 512 is arranged a weight to balance the weight of armature 514. A pair of insulated spaced contact springs are mounted on bracket 510 in angular relation so as to converge opposite the armature. Lever 512 carries a bracket 515 having an adjustable screw 516 in the end thereof for engaging the outer contact spring to move its contact point into engagement with the contact point of the inner contact spring when the lever is moved clockwise about its pivot as viewed in Figure 2.

Lever 512 is biased into position with the points of the contact springs separated by outer contact spring 517. The point of the outer contact spring is moved into engagement with the point of the inner spring by pulling armature 514 into slot 520 in alignment with plate 504. A lug 521 is formed on the lower end of the lever which engages end 505 of plate 504 on one side of the slot to limit the inward movement of the lever. A screw extends through an aperture provided in this lug into plate 504 and has an adjustable nut provided on its outer end to limit the outward movement of the lever.

Plates 522 and 523 are secured to the frame to enclose the switch, plate 523 being removable to form a cover. Terminals 524 are provided for connecting the coil of the electromagnet and the switch contacts in the system.

The magnetic circuit for the switch is from the core 503 through front plate 504, across the air gap between the ends 505 and 506 of the front and back plates, back to the core through the back plate. When the switch is out of the zone of influence of a magnetic plate 525 in the hatchway, the reluctance of the air gap between the ends of the plates is so high that insufficient flux passes to cause the armature to be pulled into attracted position. When the switch, with coil 27 energized, is moved into position where armature 514 comes opposite a magnetizable plate in the hatchway, the reluctance of air gap between the ends of the plates is greatly decreased, causing a corresponding increase in the amount of flux. This increase in flux is sufficient to pull the armature into attracted position, thereby effecting the engagement of the points of the contact springs. When the switch is moved out of cooperative relationship with the magnetizable plate, the reluctance of the air gap is again increased and spring 517 returns the lever to position where the contact points are separated. The end 505 of plate 504 is tapered away from the armature, both above and below the armature, to provide a sharp point of operation and release of the armature as the switch moves into and out of the influence of a magnetizable plate. When the switch moves past a plate with coil 272 deenergized, the armature is not attracted and the points of the contact springs are not engaged.

Figure 5:
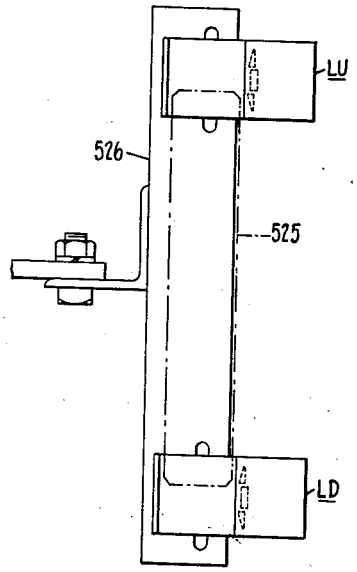
Figure 5 is a view in outline illustrating the relationship of the levelling switches and magnetic plate.

As shown in Figure 5, the levelling switches are mounted on a bracket 526 secured to the elevator car. The up levelling switch is mounted above the down levelling switch so as to render the up levelling switch effective to cause upward movement of the car and the down levelling switch effective to cause downward movement of the car. The levelling switches are spaced so that, with the car level with the landing, both armatures are just out of the influence of the plate for that landing and so that upon movement of the car in either direction away from the landing a certain distance, the armature of the proper switch is pulled to attracted position to return the car to the floor level. The relative position of a plate with respect to the armatures is shown in Figure 5, where the plate is indicated in dot-and-dash lines.

There are various types of elevator control in which automatic slow down and stopping are utilized. The type illustrated is known as collective push button control. The pressing of a push button either in the car or at a landing starts the car in a direction toward the floor for which the push button is provided. The car is slowed down and stopped at landings for which push buttons have been pressed, the car being automatically restarted after each stop so long as push buttons remain to be responded to.

Push button control circuits for only four floors are illustrated. A push button is provided in the car for each of the floors. Also, a push button is provided at the first and fourth floors and an up push button and a down push button are provided both at the second and at the third floors. The location of the push buttons is shown in Figure 1 for the terminal floors and one intermediate floor. The arrangement of the push buttons in the control circuits is shown in Figure 10. The push buttons in the car are designated in accordance with their location and the floor for which they are provided. For example, 3C141 designates the third floor car button. Push buttons at the landings are designated in accordance with the floor and their direction. For example, 2U161 designates the up second floor hall button.

Figure 8:
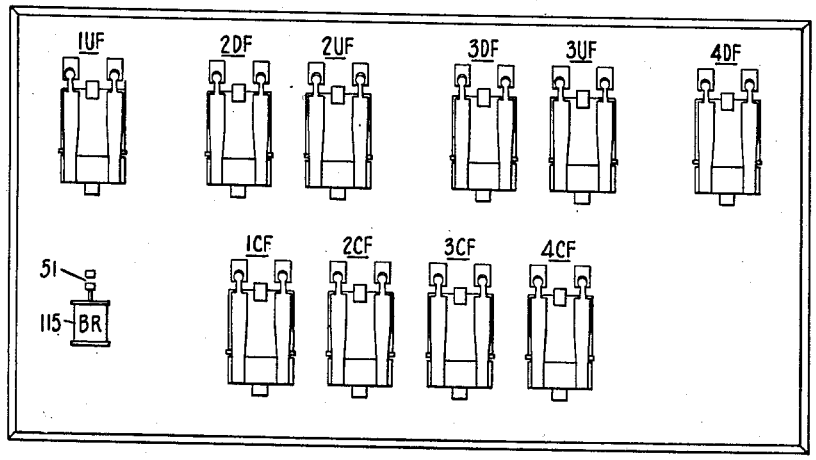
Figure 8 is a view schematically illustrating the floor relays mounted on the relay panel.

The push buttons act through floor relays to control the operation of the car, the circuits for the push buttons being fed from the rectifiers. All the floor relays are mounted on the same panel, as shown in Figure 8. The floor relays are designated similarly to their controlling push buttons, the car button floor relays being designated CF and the hall button floor relays being designated UF or DF depending upon whether they are provided for up push buttons or down push buttons. The floor relays, when operated, remain in operated condition, thereby permitting the push buttons to be released. When the call is answered, the floor relay is reset.

Figure 6:
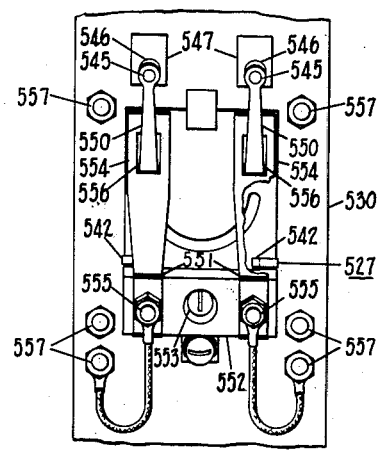
Figure 6 is an end view of a floor relay utilized in the control system chosen to illustrate the invention.
Figure 7:
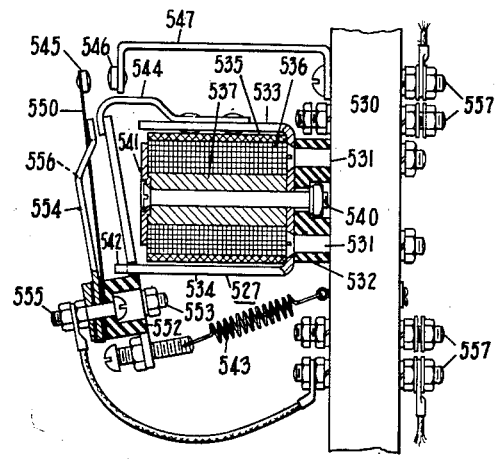
Figure 7 is a side view of the same with parts in section.

Various forms of floor relays may be utilized. A floor relay has been illustrated in which, when the relay is operated, it is held in operated condition by residual magnetism. Such a relay is illustrated in Figures 6 and 7. The armature of the relay is supported on a magnet frame 527. The frame is secured to panel 530 by screws 531, a spacer 532 of insulating material being provided between the frame and the panel. The frame is U-shaped, the legs 533 and 534 of the U extending outwardly from the panel above and below the coils 535 and 536 of the magnet. The inner coil 536 is the operating coil of the relay while the outer coil 535 is the restoring coil. These coils are wound on a core 537 which is secured to the frame by screw 540, a washer of magnetizable material being provided at the head of the screw for retaining the coils in position on the core and for increasing the effective area of the magnetizable material at the air gap between the core and the armature.

The upper leg 533 of the frame extends outwardly slightly beyond washer 541. The armature engages this leg when in attracted position, thus maintaining an air gap between the armature and the washer when the armature is in attracted position.

The armature is pivotally supported on the lower leg 534 of the frame. To provide a hinge for the armature, the leg 534 is formed with a pair of hooks 542. The armature, in turn, is narrowed at the point where it is supported by leg 534 to enable it to be inserted between the hooks. The shoulders thus formed on the armature rest on the hooks, providing a pivotal support. The armature is biased to unattracted position by spring 543. The outward pivotal movement of the armature is restricted by stop 544 secured to the upper leg of the frame.

The relay is provided with a pair of movable contacts 545 for cooperation with a pair of stationary contacts 546. The stationary contacts 546 comprise contact points on the outer ends of brackets 547 extending outwardly from the panel. The movable contacts 545 are carried by the armature, each comprising a leaf spring 550 having a contact point for cooperation with the contact point of the corresponding stationary contact. The lower ends of the springs are arranged in slots 551, on one side of the contact base 552. The contact base 552 is of insulating material and is secured to the armature below its hinge point by means of screw 553. Each slot slopes inwardly from its bottom end as shown in Figure 7. A spring guard 554 is also arranged in each slot, the spring and spring guard being secured in this slot by means of a screw 555. Each spring guard extends upwardly from base 552 and is provided with a square shaped aperture 556 through which the contact spring extends. The relay is connected in the system by means of the terminals 557.

Upon operation, when the coil 536 is energized, the armature is pulled to attracted position, causing the engagement of contacts 545 with stationary contacts 546. The core 537 is made of a grade of steel which has the quality of retaining its magnetism. The core becomes sufficiently magnetized to retain the armature in attracted position by residual magnetism after the coil is deenergized.

To reset the relay, winding 535 is energized in such way as to "kill" the residual magnetism. Spring 543 thereupon acts to effect separation of the movable contacts from the stationary contacts, pulling the armature outwardly into engagement with stop 544.

The floor relays are arranged to act through direction mechanism on a floor controller to control the direction of travel of the elevator car. This floor controller is also utilized in the form of control illustrated to initiate and control the slowing down of the car. A floor controller, of the form disclosed in the patent to Dunn No. 2,032,475, granted March 3, 1936, has been diagramatically illustrated. The travelling direction cam of the floor controller, the direction switches, the stationary contacts and cooperating brushes are shown in Figure 10, while the pawl mechanism, the framework of the floor controller and the floor controller drive are shown in Figure 1.

Referring to Figure 1, the frame 560 comprises a base and top plate joined by standards 561. The crosshead 562 is driven by screw 563 which extends vertically between the top and bottom of the frame. This screw is driven by drum 564 through the intermediary of bevel gears. The drum is driven from the elevator car by means of piano wire which is preferably cadmium plated. This wire is arranged in two sections. One section of the wire is attached at one end to the top of the elevator car frame. From the car it extends upwardly to the drum on one side thereof and is wound around the drum in a certain direction in the spiral groove provided on the drum. The other end of this section of the wire is secured to the drum at the point on the end of the drum where the spiral groove ends. The other section of wire is secured at one end to the top of the counterweight through the intermediary of a spring 565. From the counterweight it extends upwardly to the drum on the other side thereof and is wound around the drum in the opposite direction in the spiral groove, to occupy the remaining space on the drum. The other end of this section of the wire is secured to the drum at the point where the groove ends. Thus one section of wire winds up as the other section unwinds in the driving operation, the section which winds up taking up the space vacated by the unwinding section. A silent drive is thus provided which is unaffected by sliding or stretching ropes, and the crosshead is driven by screw 563 in exact synchronism with the elevator car.

The pawl mechanism is carried by crosshead 562. The pawls cooperate with stopping collars 566 on standards 561. The coil of the pawl magnet and the contacts operated by the pawls are shown in the wiring diagram of Figure 11 and their operation will be described later.

The travelling cam is also carried by the crosshead. Referring to Figure 10, it comprises an upper contacting section 167, a lower contacting section 232 and an intermediate insulated section 221. The direction switches engaged by the cam are designated 216, 181, 152 and 125 for the first, second, third and fourth floors respectively. The insulated rollers on the crosshead for lifting the direction switches off the cam sections are designated 217 and 226. The stationary contacts of the floor controller controlled by the car buttons are designated 205, 174, 145 and 122 for the first, second, third and fourth floors respectively. These contacts are engaged by up brush 195 and down brush 224. An additional brush 206 is arranged between the up and down brushes for an auxiliary reset operation. The stationary contacts controlled by the down push buttons at the landings are designated 210, 175 and 146 for the first, second and third floors respectively. These contacts are engaged by down brush 225 and auxiliary reset brush 211. The stationary contacts controlled by the up push buttons at the landings are designated 176, 147 and 123 for the second, third and fourth floors respectively. These contacts are engaged by up brush 196 and auxiliary reset brush 214. The brushes are carried by the crosshead of the floor controller while the stationary contacts and direction switches are mounted on the floor controller framework in proper positions with respect to the floors for which they are provided.

The control system is illustrated for power operation of the car gate. The gate is shown as of the solid door construction. The gate operating mechanism illustrated includes an alternating current gate operating motor 57 of the squirrel cage induction type. The stator windings of the gate operating motor are designated 44, 45 and 46 while the rotor is designated 56. Power is supplied to the gate operating motor from the supply mains.

The gate operating mechanism is schematically illustrated in Figure 1. The gate operating motor 57 operates through a pinion 567 to drive a segmental rack 570. This rack is secured to the end of gate operating lever 571. Lever 571 is pivoted at 572 to the car framework and is connected at its other end by a link 573 with the car gate. The car gate is provided with hangers which operate on a track to support the gate as it is moved to open and closed position. A check 574 is provided for cushioning the gate as it nears its open and closed positions. This mechanism is operated by a lever connected to the gate operating lever by a link 575 in such way as to move upwardly during the initial motion of the gate and then downwardly to exert a checking action as the gate nears its open or closed position. A limit switch 357, biased to closed position, is arranged to be operated by a cam on the gate operating lever 571 as the gate reaches open position. The gate contacts 291 which are engaged as the gate reaches closed position are illustrated as operated by the gate operating lever.

In the control system illustrated, the gate remains open while the car is idle at a floor. The gate operating motor is energized to close the gate when a call is registered. Upon being energized, the motor rotates segmental rack 570 clockwise as viewed in Figure 1, causing the closing of the gate. As the gate reaches closed position, gate contacts 291 engage. Energization of gate operating motor 57 to open the gate is effected as the car comes to a stop at a floor. The direction of rotation of the motor is reversed under these conditions so that the segmental rack is rotated counterclockwise back into the position shown. This causes the operating lever to open the gate. As the gate starts to open, gate contacts 291 separate, and as it reaches open position, gate open limit switch 357 is engaged and opened by its cam.

The hatchway doors in the control system illustrated are manually opened but automatically returned to closed position. The hatchway doors may be either swing or sliding doors, sliding doors being illustrated for convenience. The hatchway door for the floor at which the car is illustrated in Figure 1 is not shown in order that devices inside the car may be seen. A door lock cam 576 carried by the car is provided for unlocking the hatchway door at the floor at which the stop is made. This cam is biased into position to unlock the door and is arranged to be retracted by the gate operating mechanism. For this purpose the cam is connected to gate operating lever 571 by means of a chain 577 passing over a pulley 580 pivotally mounted on the car framework. With this arrangement, as the gate is opened, the door lock cam falls into position to engage the operating roller 581 for the door lock. This door lock has been illustrated as comprising lever 582 having a catch 583 on its outer end for engaging a block 584 secured to the back of the door. When the cam is extended, this lever is moved counterclockwise about its pivot so that the catch disengages the block, thereby unlocking the door and allowing it to be manually opened. At the same time contacts 292 of the door lock are separated. As the door starts to open, it separates contacts 103 which, in order to differentiate from the door lock contacts 292, will be termed door sequence contacts. The door is connected by toggle levers 585 to a spring closer 586 so that upon the door being released it is automatically returned to closed position. This engages door sequence contacts 103. The door lock contacts 292, however, remain separated until the gate operating motor is energized to close the gate and the gate has been moved to within a certain distance, say six inches, of closed position. When this point is reached, the door cam has retracted sufficiently to permit lever 582, which is biased to door lock position, to lock the door, the catch on the end of the lever engaging the block to lock the door before the door lock contacts engage.

The door sequence contacts 103 are arranged in series relation and are represented in the wiring diagram, Figure 10, by a single set of contacts. Similarly, the door lock contacts 292 are arranged in series relation and are indicated by a single set of contacts in the wiring diagram, Figure 11.

Certain indicating lamps are utilized in the control system illustrated. Indicating lights are arranged preferably in the push button boxes at the various floors for advising intending passengers when the car is in operation. These lights are designated in Figure 10 as 71, 72, 73 and 74 for the first, second, third and fourth floors respectively. Current for the "in operation" lights is supplied from the secondary winding 67 of the supply transformer for the rectifiers 76 and 77.

A buzzer 53 is provided in the car in the control system illustrated, this buzzer being supplied with current from the supply mains through an operating transformer, the primary winding of which is designated 47 and the secondary winding 54. This buzzer is subject to a manually operable cut out switch 52, also provided in the car.

An emergency stop switch 255 is provided in the car. 62 and 233 are blades of a service switch, located on the control panel, for disconnecting the system when desired. The contacts of the various safety devices are indicated by the legend "Safeties" in Figure 11.

Figure 9:
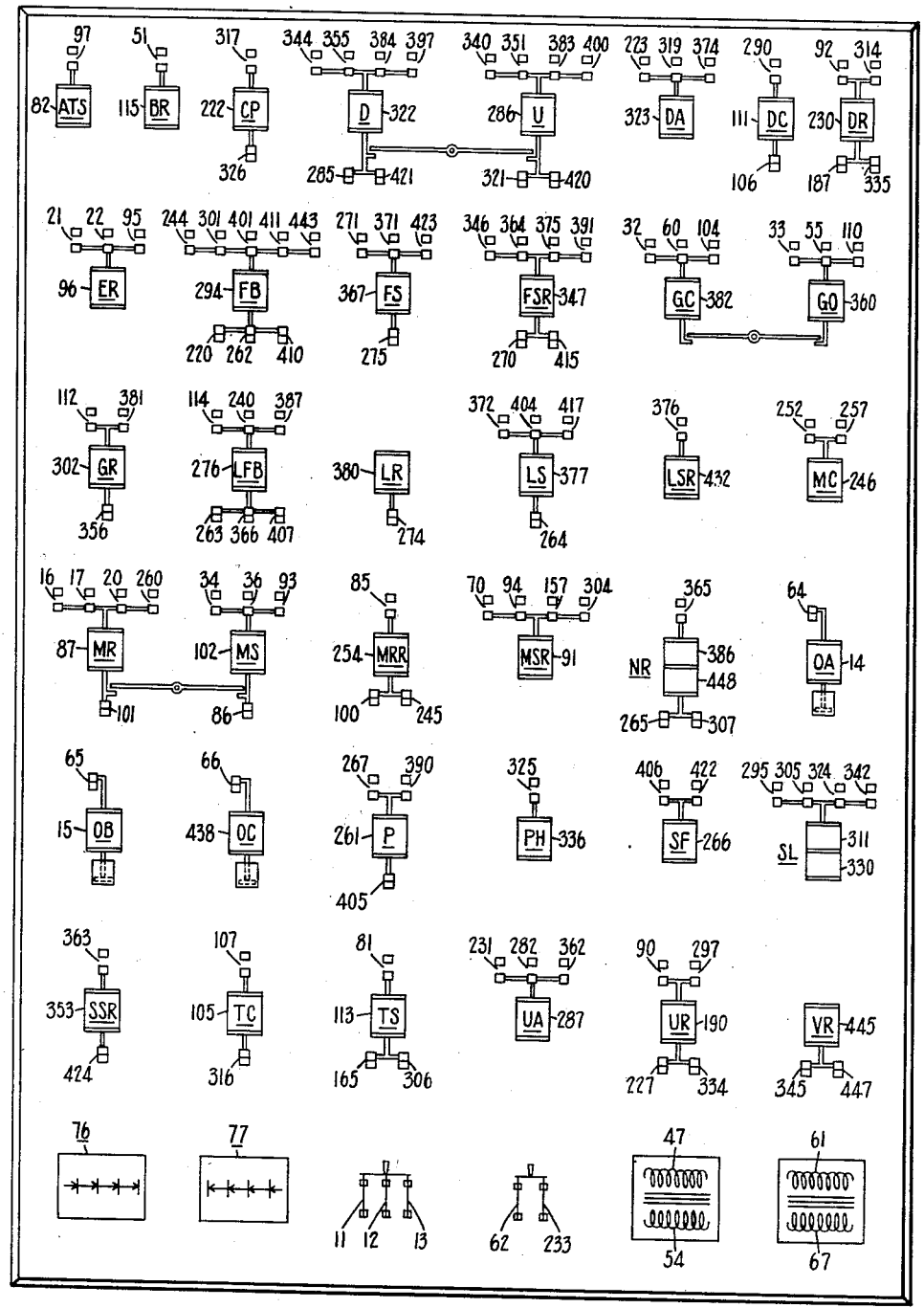
Figure 9 is a schematic representation of a control panel with the various electromagnetic switches employed in the control system chosen to illustrate the invention, showing particularly the relationship of the coils and contacts of these switches.

The electromagnet switches have been designated as follows:

ATS—Auxiliary time switch
    BR—Buzzer relay
    CP—Call pick-up relay
    D—Down direction switch
    DA—Down auxiliary direction switch
    DC—Door contact switch
    DR—Down direction switch relay
    ER—Exciter switch
    FB—Field and brake switch
    FS—Fast and slow speed switch
    FSR—First slow down relay
    GC—Gate close switch
    GO—Gate open switch
    GR—Gate control relay
    LD—Down levelling switch
    LFB—Levelling field and brake switch
    LR—Levelling switch relay
    LS—Load switch
    LSR—Load switch relay
    LU—Up levelling switch
    MC—Minimum current shunt field switch
    MR—Motor-generator running switch
    MRR—Motor-generator running switch relay
    MS—Motor-generator starting switch
    MSR—Motor-generator starting switch relay
    NR—Non-reversal switch
OA, OB, OC—Overload switches
    P—Potential switch
    PH—Pick-up holding relay
    SF—Series field switch
    SL—Slow down switch
    SSR—Second slow down relay
    TC—Time cancelling relay
    TS—Time switch
    U—Up direction switch
    UA—Up auxiliary direction switch
    UR—Up direction switch relay
    VR—Voltage relay Throughout the description which follows, these letters, in addition to reference numerals, will be applied to parts of the above designated switches. For example, "contacts U340" indicates that the contacts are on the up direction switch U, while "operating coil DA323" indicates that the coil operates the down auxiliary direction switch DA. The relationship of the coils and contacts of these switches may be seen from Figure 9, where the switches are arranged, in so far as practical, in alphabetical order. The relationship of these coils and contacts may also be seen from Figures 10a, 10b, 11a and 11b where these switches are arranged in alphabetical order and are shown in spindle form. The positions of these coils and contacts in the wiring diagrams may be found by referring to Figures 10a and 10b and 11a and 11b where the coils and contacts are positioned on the spindles in horizontal alignment with the corresponding elements of the wiring diagrams. Thus by first locating any coil or contact on the spindle diagrams, the corresponding element of the wiring diagrams may be readily found. The letters PM are employed in a similar manner to designate the pawl magnet of the floor controller.

The electromagnetic switches are illustrated in Figures 10 and 11 in deenergized position. Also, all latching switches are illustrated in reset condition. The gate contacts 291, door sequence contacts 103 and door lock contacts 292 are all shown in engagement. A resistance and condenser in series are connected across the coil of each of the switches controlled by the levelling switch contacts to minimize the effects of arcing of these contacts. The resistances are designated 278, 280 and 332 and the condensers are designated 279, 281 and 333.

Assume that the car is standing idle at the first floor. The floor controller circuits of Figure 10 are illustrated in accordance with this assumption. As the car is idle, the first floor hatchway door is closed but not locked and the car gate is open. Door lock contacts 292 and gate contacts 291 are therefore both separated. Door sequence contacts 103, however, are in engagement. Thus a circuit is complete for coil DC111 of the door contact switch across terminals 79 and 80 of the rectifier. Contacts DC106, therefore, are separated and coil TS113 of time switch TS is deenergized. It will be further assumed that the time interval of the time switch is expired. Also, contacts DC290 are in engagement preparing the circuit for coil U286 of the up direction switch and for the coils of other electromagnetic switches.

Assume now that an intending passenger at the third floor presses the up third floor hall button 3U134. This connects coil 3UF135 of the up third floor relay across the terminals of the rectifier through coil BR115 of the buzzer relay. Assuming switch 52 closed, the operation of the buzzer relay to engage contacts BR51 completes a circuit for the buzzer 53, causing the buzzer to sound.

The floor relay, upon operation, engages contacts 3UF137 and 3UF140. As previously explained, the floor relay is magnetically latched in operated condition so that the contacts remain in engagement after the push button is released. Contacts 3UF137 connect up third floor controller contact 147 through restoring coil 3UF136 of the floor relay to terminal 80 of the rectifier. Contacts TS165 of the time switch being in engagement, contacts 3UF140 complete a circuit for coil UR190 of the up direction switch relay, this circuit being from terminal 79 of the rectifier, through contacts TS165, resistance 150, contacts 3UF140, direction switches 152 and 125, contacts DR187 of the down direction switch relay, coil UR190, to terminal 80 of the rectifier.

Up direction switch relay UR, upon operation, engages contacts UR90 and UR297 and separates contacts UR227 and UR334. Contacts UR227 are interlock contacts for coil DR230 of the down direction switch relay. Contacts UR297 further prepare a circuit for coil U286 of the up direction switch. Contacts UR90 connect coil MSR91 of the motor-generator starting switch relay across the rectifier terminals.

Relay MSR, upon operation, engages contacts MSR70, MSR94, MSR157 and MSR304. Contacts MSR304 prepare the circuit for coil SL311 of the slow down switch. Contacts MSR70 connect the "in operation" lights 71, 72, 73 and 74 at the landings across operating transformer secondary winding 67, causing these lights to be lighted. Contacts MSR94 complete a circuit for coil MS102 of the motor-generator starting switch through contacts MRR100 of the motor-generator running switch relay and contacts MR101 of the motor-generator running switch across the terminals of the rectifier.

Motor-generator starting switch MS, upon operation, engages contacts MS34, MS36 and MS93 and separates contacts MS86. Contacts MS86 are in the circuit for coil MR87 of the motor-generator running switch. Contacts MS34 and MS36 connect the stator windings of the driving motor of the motor generator set in star relation to the supply mains. The circuit for phase winding 24 is from supply main I through blade 11 of the main line switch, overload switch coil OA14, phase winding 24 and contacts MS34 to star point 35. The circuit for phase winding 25 is from supply main II through blade 12 of the main line switch, phase winding 25 to star point 35. The circuit for phase winding 26 is from supply main III through blade 13 of the main line switch, overload switch coil OB15, phase winding 26, contacts MS36 to star point 35.

Contacts MS93 connect coil ER96 of the exciter switch across terminals 79 and 80 of the rectifier through contacts MSR94. The exciter switch, upon operation, engages contacts ER21, ER22 and ER95. Contacts ER95 establish a self-holding circuit for the switch, by-passing contacts MS93. Contacts ER21 and ER22 connect the phase windings of the exciter driving motor to the supply mains. Thus, both the exciter set and the motor generator set are started in operation.

The exciter is self-excited. The field winding 251 of the elevator motor is connected across the exciter. This circuit is through resistance 247 which serves to provide a "standing" field value for the elevator motor field while the elevator motor is at rest. When the elevator motor field builds up to a certain value, say 80% of its "standing" value, the current supplied to coil MC246 of the minimum current shunt field switch is sufficient to cause this switch to operate.

Switch MC, upon operation, engages contacts MC252 and MC257. Contacts MC257 prepare the circuit for coil P261 of the potential switch. Contacts MC252 connect coil MRR254 of the motor-generator running switch relay across the exciter. This switch, upon operation, engages contacts MRR85 and separates contacts MRR100 and MRR245. Contacts MRR245 remove the short circuit for resistance 241 to decrease the excitation of exciter field winding 243. The short-circuiting of resistance 241 by contacts MRR245 is for the purpose of forcing the exciter field to cause the exciter quickly to build up to full voltage. By subjecting relay MRR to the minimum current shunt field switch, the short circuit for the field forcing resistance is removed as the exciter comes up to full voltage.

The series field switch SF operates as the exciter voltage comes up to full value, its coil SF266 being connected across the exciter through contacts LS264 and NR265. The series field switch, upon operation, engages contacts SF406 and SF422 to short-circuit generator series field winding 433.

Contacts MRR85 of the motor-generator running switch relay prepare the circuit for coil MR87 of the motor-generator running switch. Contacts MRR100 break the circuit for coil MS102 of the motor-generator starting switch. The motor-generator starting switch drops out, separating contacts MS34, MS36 and MS93 and reengaging contacts MS86. The reengagement of contacts MS86 connects coil MR87 of the motor-generator running switch across the terminals of the rectifier. The motor-generator running switch, upon operation, engages contacts MR16, MR17, MR20 and MR260 and separates contacts MR101. The separation of contacts MS34 and MS36 of the motor-generator starting switch and the engagement of contacts MR16, MR17 and MR20 of the motor-generator running switch change the connections of the stator windings of the driving motor of the motor generator set from star to delta relation. Contacts MS86 and MR101 serve as electrical interlocks for the motor-generator starting and running switches. To insure their proper sequence of operation, these switches are also mechanically interlocked. It is to be noted that the change-over of the connections of the stator windings of the driving motor is subject both to the building up of the exciter voltage and to the time constant of the elevator motor field. This arrangement prevents the change of connections from star to delta until current in the stator windings passes its peak so that objectionable surges are avoided.

Contacts MR260 of the motor-generator running switch complete the circuit for coil P261 of the potential switch. The potential switch, upon operation, engages contacts P267 and P390 and separates contacts P405. Contacts P390 prepare the circuit for generator direction field winding 394. Contacts P405 remove one of the short circuits from generator shunt field winding 414. Contacts P267 are in a circuit common to the coils of various of the control switches subject to the exciter. The engagement of these contacts completes the circuit for coil SL311 of the slow down switch through contacts DC290, MSR304, TS306 and TC316 in parallel and contacts NR307.

The slow down switch SL, upon operation, engages contacts SL295, SL305, SL324 and SL342. Contacts SL295 prepare the circuit for coil U286 of the up direction switch. Contacts SL342 prepare the circuit for coil FSR347 of the first slow down relay. Contacts SL324 complete a circuit for coil PM341 of the pawl magnet. The pawl magnet retracts the pawls, causing the engagement of pawl magnet contacts PM293, PM352 and PM370. Contacts PM293 further prepare the circuit for the coil U286 of the up direction switch. Contacts PM352 prepare the circuit for coil SSR353 of the second slow down relay. Contacts PM370 complete the circuit for coil LR380 of the levelling switch relay. This relay separates contacts LR274, breaking the circuit for coils LU272 and LD273 of the up levelling switch and down levelling switch respectively, thereby rendering the levelling mechanism ineffective.

Contacts SL305 of the slow down switch complete a circuit through contacts DC290 and MSR304 for coil GR302 of the gate control relay. This relay, upon operation, engages contacts GR112 and GR381 and separates contacts GR356. Contacts GR112 complete a circuit for coil TS113 of the time switch. The time switch operates immediately to engage contacts TS81 and separate contacts TS165 and TS306. Contacts TS81 complete a circuit for coil ATS82 of the auxiliary time switch. This auxiliary time switch engages contacts ATS97. The purpose of contacts ATS97 and contacts TS165 and TS306 will be explained later.

Contacts GR356 of the gate control relay are in the circuit for coil GO360 of the gate open switch. Contacts GR381 complete the circuit for coil GC382 of the gate close switch. The gate open switch and gate close switch are electrically interlocked by contacts GR356 and GR381. They also are mechanically interlocked. The gate close switch, upon operation, engages contacts GC32, GC30 and GC104. The engagement of contacts GC104 completes a circuit for coil TC105 of the time cancelling relay. This relay, upon operation, engages contacts TC107 and separates contacts TC316. Contacts TC107 by-pass contacts GC104 to establish a self-holding circuit. The separation of contacts TC316 breaks the circuit for coil SL311 of the slow down switch. The slow down switch is of the same type switch as the floor relays, being magnetically retained in operated condition when the circuit for its operating coil is broken. Its restoring coil is designated SL330.

The engagement of contacts GC32 and GC30 of the gate close switch completes the circuit for the stator windings 44, 45 and 46 of the gate operating motor 57. The phase rotation of the voltages thus applied to this motor is such as to cause operation of the gate operating mechanism to effect the closing of the gate.

When the gate nears closed position, the door lock retiring cam lifts, locking the hatchway door and closing door lock contacts 292. When the gate is fully closed, gate contacts 291 close. This completes a circuit for coil FB294 of the field and brake switch, coil U286 of the up direction switch and coil UA287 of the up auxiliary direction switch. This circuit is through contacts DC290, gate contacts 291, door lock contacts 292, contacts PM293 and coil FB294, contacts SL295, contacts UR297, terminal limit switch 283, contacts D285, coil U286 and coil UA287. Switch FB engages contacts FB244, FB301, FB401, FB411 and FB443 and separates contacts FB220, FB262 and FB419. Switch UA engages contacts UA231, UA282 and UA362. Switch U engages contacts U351, U340, U383 and U400 and separates contacts U321 and U420.

Contacts U321 are in the circuit for coils D322 and DA323 of the down direction switch and down auxiliary direction switch respectively, these contacts and contacts D285 serving as electrical interlocks. Contacts UA362 prepare circuits for coil FS367 of the fast and slow speed switch and coil LS377 of the load switch. Contacts UA231 render floor controller up brushes 195 and 196 "alive". Contacts FB220 render the auxiliary reset brushes 206, 211 and 214 "dead". Contacts FB443 connect coil VR445 of the voltage relay across the generator armature. Contacts U420 break the other short circuit across generator shunt field winding 414. Contacts FB410 disconnect generator demagnetizing field winding 427 from across the generator armature. Contacts FB411 prepare the circuit for generator shunt field winding 414.

Contacts U383 and U400 together with contacts FB401 complete a circuit for generator direction field winding 394 through resistance 392. Contacts FB401 also complete the circuit for brake release coil 403. This causes the brake to be released and with the energization of field winding 394 sufficient voltage is generated by the generator armature 437 for application to motor armature 442 to effect the starting of the car. The direction of current flow in field winding 394 causes the polarity of the voltage generated to be such as to cause the car to start in the up direction. The engagement of contacts FB244 short-circuits resistance 247, bringing the elevator motor field winding 251 up to full strength for the starting operation.

The engagement of contacts U383 and U400 also completes a circuit for coil NR386 of the non-reversal switch. The energization of this coil, however, does not cause the operation of the switch. The engagement of contacts U340 completes a circuit through contacts SL342 for coil FSR347 of the first slow down relay. The engagement of contacts U351 completes a circuit for coil SSR353 of the second slow down relay. The first slow down relay engages contacts FSR346, FSR364, FSR375 and FSR391 and separates contacts FSR270 and FSR415. The second slow down relay engages contacts SSR363 and separates contacts SSR424. The engagement of contacts FSR375 further prepares the circuit for coil LS377 of the load switch. Contacts FSR346 complete a by-pass circuit through contacts VR345 for contacts SL342, thereby establishing a self-holding circuit. Contacts FSR364 and SSR363 further prepare the circuit for coil FS367 of the fast and slow speed switch. Contacts FSR391 short-circuit resistance 392 in circuit with field winding 394, thereby increasing the excitation of the generator and thus the voltage applied by the generator to the elevator motor. This increases the speed of the car.

The non-reversal relay is provided with two coils, coil NR386 previously mentioned, controlled by the direction switches, and coil NR448 connected across the generator armature subject to contacts VR447. These two coils act cumulatively. Neither alone is effective to cause the switch to operate. However, when the voltage applied to the elevator motor armature reaches say 10 volts, the cumulative action of the two coils causes the switch to operate. Upon operation, the switch engages contacts NR365 and separates contacts NR265 and NR307. The separation of contacts NR265 breaks the circuit for coil SF266 of the series field switch. This switch, in turn, separates contacts SF406 and SF422 to remove the short circuit for the generator series field winding 433. The purpose of this arrangement is to maintain the generator series field short-circuited until the generator has built up a voltage.

The engagement of contacts NR365 completes a circuit through contacts PM370, limit switch 361, contacts UA362, contacts SSR363, contacts FSR364 and contacts LFB366 for coil FS367 of the fast and slow speed switch. Switch FS, upon operation, engages contacts FS271, FS371 and FS423 and separates contacts FS275. Contacts FS371 by-pass contacts SSR363 and FSR364 to establish a self-holding circuit.

Contacts FS423 connect generator shunt field winding 414 across generator armature 437 through contacts FB411, inside of the generator series field winding 433 and interpole field winding 435. This renders the generator self-exciting. The generator thereupon gradually builds up to full voltage as a self-excited generator with a polarity determined by the direction of excitation of the generator direction field winding 394. The purpose of subjecting the fast and slow speed switch to the non-reversal switch is to prevent the generator shunt field being connected across the generator armature until a generator voltage is established for the direction in which it is desired to have the car travel. The gradual increase of the generator voltage to full value causes the elevator car to be gradually brought up to full speed. The short circuit for generator series field winding 433 having been removed, the generator series field is effective both for acceleration and full speed running of the elevator motor.

When the voltage applied to elevator motor armature 442 attains a certain value, say half full generator voltage, coil VR445 of the voltage relay, connected across the generator armature, becomes sufficiently energized to cause the relay to operate. Upon operation this relay separates contacts VR345 and VR447. Contacts VR447 break the circuit for coil NR448 of the non-reversal switch, obviating subjecting this coil to higher voltage than that for which designed. This switch, however, is maintained operated by coil NR386.

The coil LSR432 of the load switch relay is connected in parallel with interpole field winding 435 of the generator. Thus, this relay is subject to the current in the generator armature-motor armature circuit. The relay is set so that it operates during starting of the car when the load on the elevator motor is approximately equal to empty car in the down direction. Upon operation, the relay engages its contacts LSR376 to complete a circuit for coil LS377 of the load switch, this circuit being through contacts PM370, limit switch 361, contacts UA362 and contacts FSR375. The load switch engages contacts LS372, LS404 and LS417 and separates contacts LS264. Contacts LS404 short-circuit resistance 413 in circuit with generator shunt field winding 414. This increases the excitation of the generator shunt field winding to assist the series field winding in compensating for load. The load switch relay LSR drops out upon recession of the starting current, the load switch being maintained operated through contacts LS372.

When the car was positioned at the first floor, center direction cam section 221 was in engagement with the arm of first floor direction switch 216, and the up direction cam section 167 was in engagement with the arm of second floor direction switch 181. As the car moves in the up direction, the up cam section moves into engagement with the arm of the third floor direction switch 152, opening this switch to transfer the circuit for coil UR190 to cam section 167 and the arm of switch 152. Also, the center direction cam section 221 successively disengages the first floor and second floor direction switches 216 and 181 as the car moves in the up direction and these switches are transferred to down circuits.

As the car nears the third floor landing, up brushes 195 and 196 engage stationary contacts 145 and 147 respectively. As the up third floor relay is operated, the engagement of brush 196 with contact 147 completes a circuit from rectifier terminal 79 through coil CP222 of the call pick-up relay, contacts UA231, brush 196, contact 147, contacts 3UF137 and coil 3UF136 to terminal 80 of the rectifier. The voltage thus applied to reset coil 3UF136 of the floor relay is not sufficient to reset this relay. The call pick-up relay CP, however, operates to engage contacts CP317 and separate contacts CP326. The separation of contacts CP326 prevents the energization of restoring coil SL330 of the slow down switch upon engagement of contacts CP317. The engagement of contacts CP317, however, completes a circuit for coil PH336 of the pick-up holding relay through contacts SL324. The pick-up holding relay engages contacts PH325 to by-pass contacts CP317, thus establishing a self-holding circuit.

As brushes 195 and 196 disengage their respective stationary contacts 145 and 147, up insulating roller 217 engages and lifts the arm of direction switch 152 off cam section 167. This breaks the circuit for coil UR190 of up direction switch relay. This relay drops out, separating contacts UR90 and UR297 and reengaging contacts UR227 and UR334. Coils U286 and UA287 are maintained energized after the separation of contacts UR297 through contacts UA282 of the up auxiliary direction switch. The separation of contacts UR90 deenergizes coil MSR91 of the motor-generator starting switch relay. Relay MSR, upon dropping out, separates contacts MSR70, MSR94, MSR157 and MSR304. Exciter switch ER is maintained operated after the separation of contacts MSR94 through contacts ATS97. Gate control relay GR is maintained operated after the separation of contacts MSR304 through contacts FB301. Contacts MSR70 break the circuit for the "in operation" lights at the landings.

The call pick-up relay CP is maintained operated until brush 196 leaves contact 147. When this disengagement occurs, the circuit for coil CP222 is broken and the call pick-up relay drops out to separate contacts CP317 and to reengage contacts CP326. The reengagement of contacts CP326 completes the circuit through contacts SL324 and contacts PH325 for restoring coil SL330 of the slow down switch. This coil acts to "kill" the residual magnetism of the slow down switch, causing the switch to drop out. Upon dropping out, the slow down switch separates contacts SL295, SL305, SL324 and SL342. The separation of contacts SL324 breaks the circuit for coil SL330, for pick-up holding relay coil PH336 and for pawl magnet coil PM341. The pick-up holding relay PH drops out to separate contacts PH325. The deenergization of the pawl magnet releases the pawls to permit the up pawl to engage the up third floor stopping collar.

The separation of contacts SL342 of the slow down switch breaks the circuit for coil FSR347 of the first slow down relay. This relay drops out to separate contacts FSR364, FSR346, FSR375 and FSR391 and to reengage contacts FSR270 and FSR415. The separation of contacts FSR391 reinserts resistance 392 in circuit with generator direction field winding 394.

The reengagement of contacts FSR415 connects generator demagnetizing field 427 across generator armature 437, the circuit being through contacts FS423, resistance 416 and also resistance 426 provided the load switch has not operated to engage contacts LS417. The demagnetizing field winding is connected so that it acts to oppose the shunt field winding, thereby causing the generator voltage to be gradually decreased. Thus the voltage applied to the elevator motor armature decreases, causing the elevator car to slow down. If the load switch is not operated so that its contacts LS264 are not separated, the reengagement of contacts FSR270 reestablishes a circuit through contacts LS264 and contacts FS271 for coil SF266 of the series field switch. The series field switch operates to short-circuit again generator series field winding 433. This cuts out the generator series field winding during slow down, under conditions where the load on the elevator motor is less than empty car in the down direction, until the final slow down operation. However, if the load switch is operated, separating its contacts LS264, the series field winding is effective during this period as well as during final slow down.

The up pawl engages the up third floor stopping collar as the car continues its upward movement and, when a certain point is reached, pawl magnet contacts PM352 separate to break the circuit for coil SSR353 of the second slow down relay. This relay drops out to separate contacts SSR-363 and to reengage contacts SSR424. The reengagement of contacts SSR424 short-circuits resistance 416 in circuit with the generator demagnetizing field winding 427. This increases the strength of demagnetizing field winding 427 to nearly equal that of shunt field winding 414. Resistance 416 is of a fairly high value and is inserted in circuit with winding 427 to prevent too strong an effect of the demagnetizing field for the initial slow down. By reducing the effect of the demagnetizing field winding initially and then increasing its strength so as to nearly equal that of the generator shunt field winding, the rate of decrease of generator voltage is such that the desired rate of slow down of the elevator car is obtained. The demagnetizing field is slightly weaker than the shunt field in order that the shunt field winding will not be entirely neutralized.

The action of the demagnetizing field winding is the same whether the load switch has operated or not. If the load switch is operated, both resistance 413 in series with the shunt field winding and resistance 426 in series with the demagnetizing field winding are short-circuited by load switch contacts LS404 and LS417 respectively. If the load switch is not operated, these resistances are both in circuit, they being of such value as to reduce the strength of these field windings in the same proportion.

When the generator voltage has been reduced to a certain value, say about 25 percent of its normal full speed value, voltage relay VR drops out. Upon the car reaching another point still closer to the landing, pawl magnet contacts PM370 separate, breaking the circuit for coil FS367 of the fast and slow speed switch and coil LR380 of the levelling switch relay. The fast and slow speed switch, upon dropping out, separates contacts FS271, FS371 and FS423, and engages contacts FS275. The levelling switch relay upon dropping out, reengages contacts LR274.

The separation of contacts FS423 disconnects the generator demagnetizing field winding 427 and generator shunt field winding 414 from across the generator armature. The generator direction field winding 394 provides the excitation for the generator for the remainder of the slow down operation. Resistance 392, being in circuit with the direction field winding due to the previous separation of contacts FSR391, causes the excitation of the generator by the direction field winding to be such as to provide the desired generator voltage for the final slow speed operation. With the demagnetizing field winding slightly weaker than the shunt field winding, the voltage reached just before their disconnection will be slightly higher than that obtained with the direction field alone, thus providing a smooth transition back to the direction field winding.

Assuming that the circuit for coil SF266 of the series field switch is not already broken by contacts LS264 of the load switch, the separation of contacts FS271 breaks this circuit to deenergize the series field switch. This switch in turn separates contacts SF406 and SF422 to render the generator series field winding 433 effective for the final slow down operation. If load conditions are such that contacts LS264 are separated, the generator series field winding is effective for the whole slow down operation, as previously explained. The reengagement of contacts LR274 and FS275 energizes levelling switch coils LU272 and LD273. There is no resultant operation of the contacts of the levelling switch mechanism, however, until the car comes into the levelling zone. Assuming the load switch to be operated, the separation of contacts PM370 also breaks the circuit for load switch coil LS377, this switch having served its purpose.

Upon the arrival of the car in the levelling zone, the up levelling switch LU comes into cooperative relationship with the third floor magnetic plate. This effects the engagement of contacts LU277 to establish another circuit for coils U286 and UA287 of the up direction switch and up auxiliary direction switch respectively. This circuit is through contacts LR274, contacts FS275, coil LFB276 of the levelling field and brake switch, contacts LU277, contacts D285, and coils U286 and UA287. The levelling field and brake switch, upon operation, engages contacts LFB114, LFB240 and LFB-387 and separates contacts LFB263, LFB366 and LFB407. Contacts LFB366 are to insure the disconnection of the generator demagnetizing and shunt field windings from across the generator armature during the levelling operation. These contacts are arranged in the circuit for coil FS367 of the fast and slow speed switch, thereby insuring the deenergization of this coil and thus the separation of contacts FS423 in the circuit for field windings 414 and 427.

Pawl magnet contacts PM293 are not separated until after the levelling mechanism takes control in order to insure the continued energization of the coils of the direction switches. Inasmuch as with the circuits as shown, these contacts control the circuit for coil FB294 of the field and brake switch and as the latter switch controls the operation of the gate operating mechanism to open the gate, contacts PM293 are not open until the car reaches a zone within which the gate may be opened, the extent of this zone depending upon the requirements of the particular installation. Upon the separation of contacts PM293, the field and brake switch FB is deenergized.

This switch, upon dropping out, separates contacts FB244, FB301, FB401, FB411 and FB443 and reengages contacts FB220, FB262 and FB410. Contacts FB410 are in the circuit for reconnecting the generator demagnetizing field winding across the generator armature. Contacts FB244 are arranged in parallel with contacts LFB240 of the levelling field and brake switch across elevator motor field resistance 247, this resistance being maintained short-circuited until both pairs of contacts are separated. Likewise, contacts FB401 are connected in parallel with contacts LFB387 in circuit for direction field winding 394 and brake release coil 403, this winding and the brake release coil being maintained energized until both pairs of contacts are separated.

The reengagement of contacts FB220 connects the auxiliary reset brushes 206, 211 and 214 to terminal 79 of the rectifier. These brushes engage their corresponding third floor stationary contacts shortly before the car arrives at the floor. Thus, with the reengagement of contacts FB220, another circuit is established for restoring coil 3UF136 of the up third floor relay; this circuit being through contacts FB220, resistance 213, brush 214, stationary contact 147 and contacts 3UF137. The voltage applied to coil 3UF136 at this time causes the coil to exert sufficient demagnetizing effect to release the floor relay armature, resetting the floor relay.

The separation of contacts FB301 deenergizes coil GR302 of the gate control relay. This relay drops out to separate contacts GR112 and GR381 and to reengage contacts GR356. Contacts GR112 are connected in parallel with contacts LFB114 of the levelling field and brake switch in the circuit for coil TS113 of the time switch. The separation of contacts GR381 breaks the circuit for gate close switch GC382. At the same time the reengagement of contacts GR356 energizes coil GO360 of the gate open switch. The resultant separation of contacts GC32 and GC60 of the gate close switch and engagement of contacts GO55 and GO33 of the gate open switch reestablish the circuits for the stator windings of gate operating motor 57 to provide a phase rotation of the voltages applied to these windings to effect operation of the gate operating mechanism to open the gate. Resistances 23 and 63, in circuit with the gate operating motor stator windings for the gate opening operation, are to reduce the torque of the motor and thus minimize the shear hazard when a collapsible gate is used. For solid car door constructions, these resistances may be omitted.

As the gate opens, the door lock cam falls into position to effect the unlocking of the third floor hatchway door. When the gate reaches open position, gate open limit switch 357 opens, breaking the circuit for coil GO360 of the gate open switch. This switch thus drops out to deenergize gate operating motor 57 and the gate operating mechanism is brought to a stop.

Just before the car reaches an exact level with the landing, up levelling switch LU moves out of influence of the magnetic plate and contacts LU277 separate. This breaks the circuit for coil LFB276 of the levelling field and brake switch, coil U286 of the up direction switch and coil UA287 of the up auxiliary direction switch. Switch LFB, upon dropping out, separates contacts LFB114, LFB240 and LFB387 and reengages contacts LFB263, LFB366 and LFB407. Switch U, upon dropping out, separates contacts U340, U351, U383 and U400 and reengages contacts U321 and U420. Switch UA, upon dropping out, separates contacts UA231, UA282 and UA362.

The separation of contacts U383 and U400 deenergizes the generator direction field winding 394. The brake release coil 403 is deenergized by the separation of contacts LFB387 as contacts PM293 are set to open to drop out switch FB at least by the time switch LFB is deenergized. The brake is thereupon applied to bring the car to rest level with the third floor landing.

At the same time that direction field winding 394 is deenergized, generator demagnetizing field winding 427 is connected across the generator armature by contacts LFB407 through contacts FB410, the demagnetizing field winding acting to counteract the residual flux of the generator field. The separation of contacts LFB240 reinserts resistance 247 in circuit with elevator motor field winding 251. This reduces the current in the elevator motor field winding to a "standing" field value. Coil NR386 of the non-reversal switch is deenergized along with the deenergization of direction field winding 394, causing this switch to drop out. This reengages contacts NR265 to reestablish a circuit for coil SF266 of the series field switch. The series field switch in turn engages contacts SF406 and SF422 to short-circuit the series field winding. The connection of the demagnetizing field winding across the generator armature and the short-circuiting of the series field winding reduces the generator circulating currents to a minimum while the motor generator set is idling.

The separation of contacts UA231 disconnects brushes 195 and 196 from rectifier terminal 79. The separation of contacts LFB114 breaks the circuit for coil TS113 of the time switch. Should the gate opening operation be not completed at the time contacts LFB114 separate, the time switch is maintained energized by contacts GO110 of the gate opening switch.

Should the car overrun the floor, down levelling switch LD comes under the influence of the third floor magnetic plate and engages contacts LD331. This completes a circuit for coil LFB276 of the levelling field and brake switch, coil D322 of the down direction switch and coil DA323 of the down auxiliary direction switch. Down direction switch D engages contacts D384 and D397 and levelling field and brake switch LFB engages contacts LFB387, reconnecting the direction field winding 394 across the exciter and energizing the brake release coil 403 to release the brake. The direction of current flow through the direction field winding is now reversed, thus causing the car to move in a down direction. At the same time that the direction field winding is energized, the demagnetizing field winding 427 is disconnected from across the generator armature by the separation of contacts LFB407. Also, contacts LFB240 engage to short-circuit resistance 247 in circuit with elevator motor field winding 251 for the return levelling operation. Non-reversal relay NR acts as before through series field switch SF to remove the short circuit for the generator series field winding for the levelling operation.

Just before the car reaches the exact floor level, down levelling switch LD moves out of influence of the magnet plate, separating contacts LD331. This deenergizes the levelling field and brake switch LFB, down direction switch D and down auxiliary direction switch DA. The resultant separation of contacts LFB387, D384 and D397 deenergizes the direction field winding and the brake release coil, and the brake is applied to bring the car to a stop. Resistance 247 is reinserted in circuit with elevator motor field winding 251 by the separation of contacts LFB240 and demagnetizing field winding 427 is reconnected across the generator armature by contacts LFB407. The series field winding is again short-circuited as a result of the deenergization of coil NR386 of the non-reversal relay.

The levelling field and brake switch, upon operation as a result of the overrun, reengaged contacts LFB114 in the circuit for coil TS113 of the time switch. As the car returned to the floor these contacts again separated. The time switch does not drop out immediately upon the deenergization of its coil, being delayed for a certain time interval. This gives the intending passenger at the third floor time to open the hatchway door and step into the car. As the door is opened, door sequence contacts 103 separate, breaking the circuit for coil TC105 of the time cancelling relay and for coil DC111 of the door contact switch. The door contact switch, upon dropping out, separates contacts DC290 and reengages contacts DC106. Contacts DC106 reestablish the circuit for coil TS113 of the time switch, causing this switch to be restored to full operated condition.

Upon the passenger entering the car and releasing the hatchway door, the door closes automatically, effecting the engagement of the door sequence contacts 103. This reenergizes door contact switch DC, which engages its contacts DC290 and separates its contacts DC106. The separation of contacts DC106 deenergizes the time switch. The time which elapses after the deenergization of the time switch before the switch fully opens permits the passenger to press a car button for his desired destination and thus determine the direction of car travel. As the intending passenger pressed an up hall button at the third floor, he indicated an intention to travel in the up direction, and would press the car button for the fourth floor. However, in order that operation of the car in the down direction may be described, it will be assumed instead that he presses the car button for a floor below the third floor.

Assume that the first floor car button 1C201 is pressed. This causes operation of the first floor car button floor relay 1CF, which establishes a circuit directly from terminal 79 of the rectifier through contacts 1CF215 for coil DR230 of the down direction switch relay. Down direction switch relay DR, upon operation, engages contacts DR92 and DR314 and separates contacts DR187 and DR335. Contacts DR187 are interlock contacts for the coil of the up directions switch relay. Contacts DR314 prepare a circuit for coil D322 of the down direction switch. Contacts DR92 complete a circuit for coil MSR91 of the motor-generator starting switch relay.

Relay MSR, upon operation, engages contacts MSR304, completing a circuit for coil SL311 of the slow down switch. The slow down switch in turn effects the energization of the pawl magnet to attract the pawls, thus causing the operation of the levelling switch relay LR to deenergize the up and down levelling switch coils LU272 and LD273. The slow down switch also causes the operation of gate control relay GR, which in turn establishes another circuit for time switch TS and effects the closing of the car gate and locking of the hatchway door as previously described. If the car button had been pressed before the hatchway door closed, the closing of the gate would be delayed until the door closed to engage door sequence contacts 103. This is due to the fact that switches SL and GR cannot operate until door contact switch contacts DC290 engage.

With the closing of door lock contacts 292 and gate contacts 291, a circuit is completed for the field and brake switch FB, down direction switch D and down auxiliary direction switch DA. The down direction switch, upon operation, engages contacts D344, D355, D384 and D397 and separates contacts D285 and D421, these contacts corresponding to contacts U340, U351, U383, U406, U321 and U420 respectively. The down auxiliary direction switch DA, upon operation, engages contacts DA223, DA319 and DA374, these contacts corresponding with up auxiliary direction switch contacts UA231, UA712 and UA362 respectively.

The engagement of contacts D384 and D397 together with the engagement of contacts FB401 of the field and brake switch connects the direction field winding 394 across the exciter. Contacts FB401 also connect the brake release coil across the exciter, effecting the release of the brake. The direction of current flow through the direction field winding 394 is such as to cause the polarity of the voltage generated to be such as to start the car in the down direction. At the same time the circuit for the direction field winding is established, demagnetizing field winding 427 is disconnected from across the generator armature by the separation of contacts FB410. Contacts DA319 establish a holding circuit for coils FB294, D322 and DA323. Contacts DA223 of the down auxiliary direction switch render the down brushes 224 and 225 effective.

The non-reversal relay NR acts as before, when the polarity of the generator has been definitely established, to deenergize coil SF266 of the series field switch, thereby effecting the removal of the short circuit for the generator series field winding. At the same time, relay NR causes the operation of the fast and slow speed switch FS. This switch engages contacts FS423, which connects the shunt field winding 414 across the generator armature, thereby rendering the generator self-excited. The generator thereupon gradually builds up to full operating voltage. It is believed that other steps of operation involved in starting the car in the down direction will be understood from previous description.

Upon the arrival of the car at a certain distance from the first floor landing, down brush 224 engages contacts 205, causing the operation of call pick-up relay CP. Upon the brushes leaving the contacts, the first floor direction switch 216 is engaged and lifted off cam section 232 by insulating roller 226 deenergizing coil DR230 of the down direction switch relay, which in turn, by the separation of its contacts DR92, causes the deenergization of motor-generator starting switch relay MSR.

As brush 224 leaves contact 205, the call pick-up relay CP, in conjunction with the pick-up holding relay PH, causes the energization of coil SL330 of the slow down switch to reset this switch. The reset of the slow down switch causes, through the separation of contacts SL324, the deenergization of the pawl magnet, releasing the pawls to permit the down pawl to engage the first floor stopping collar. Also, the separation of contacts SL342 of the slow down switch deenergizes coil FSR347 of the first slow down relay. This relay, upon dropping out, reinserts resistance 392 in circuit with direction field winding 394 and reconnects demagnetizing field winding 427 across the generator armature. As a result, the generator voltage is gradually decreased as before, causing the car to gradually slow down.

When pawl magnet contacts PM352 separate, coil SSR353 of the second slow down relay is deenergized to effect the short circuit of resistance 416 in circuit with demagnetizing field winding 427 to bring the strength of this field winding up to nearly that of shunt field winding 414. Upon separation of pawl magnet contacts PM370, coil FS367 of the fast and slow speed switch and relay LR380 of the levelling switch relay are deenergized. The dropping out of the fast and slow speed switch disconnects the shunt field winding and demagnetizing field winding from across the generator armature, causing the remainder of the slow down operation to be effected on direction field winding 394.

The control of the series field winding during downward travel is the same as previously described for upward travel, the load switch LS determining whether or not the series field is utilized for the slow down operation. If the series field is not already in circuit, the deenergization of the fast and slow speed switch effects the deenergization of the series field switch, which drops out to remove the short circuit for the series field winding.

The levelling mechanism is rendered effective as a result of the deenergization of the levelling switch relay LR and the fast and slow speed switch FS. Upon the arrival of the car in the levelling zone, the down levelling switch LD comes into cooperative relationship with the first floor magnetic plate. This effects the engagement of contacts LD331 to establish another circuit for coils D322 and DA323 of the down direction switch and down auxiliary direction switch respectively, this circuit being through coil LFB276 of the levelling field and brake switch. Pawl magnet contacts PM293 act to maintain the direction switch circuits as before until after the levelling mechanism takes control. Contacts PM293, upon separation, cause the deenergization of field and brake switch FB. As a result, contacts FB220 connect reset brush 206 to terminal 79 of the rectifier, establishing another circuit for reset coil ICF203 of the first floor car button floor relay, causing this relay to be reset. Also, contacts FB301 separate to deenergize coil GR302 of the gate control relay, this relay in turn energizing coil GO360 of the gate open switch, causing the opening of the car gate and the unlocking of the first floor hatchway door.

Just before the car reaches an exact level with the landing, down levelling switch LD moves out of influence of the magnetic plate and contacts LD331 separate. This breaks the circuit for coil LFB276 of the levelling field and brake switch, coil D322 of the down direction switch and coil DA323 of the down auxiliary direction switch. The resultant separation of contacts D397, D384 and LFB387 effects the deenergization of direction field winding 394 and brake release coil 403. The brake is thereupon applied, bringing the car to a stop. At the same time, demagnetizing field winding 427 is reconnected across the generator armature by contacts LFB407 and resistance 247 is reinserted in circuit with elevator motor field winding 251 by the separation of contacts LFB240. The non-reversal switch NR drops out as before to effect the reoperation of series field switch SF to short-circuit series field winding 433.

Assume that an intending passenger at the second floor pressed the down second floor hall button 2D182 after the car, on its trip to the first floor, passed the second floor landing. This does not immediately establish a circuit for the up direction relay as the car is brought to a stop at the first floor owing to the fact that contacts TS165 of the time switch are separated and that contacts MCR157 of the motor-generator starting relay also are separated due to the deenergization of this relay by the dropping out of the down direction switch relay DR to separate contacts DR92. As the passenger leaves the car at the first floor and the first floor hatchway door is reclosed to effect the reoperation of door contact switch DC, the time switch TS is deenergized by the separation of contacts DC106. Upon the expiration of the time interval for which the time switch is set, contacts TS81 separate and contacts TS165 engage. The separation of contacts TS81 deenergizes coil ATS82 of the auxiliary time switch. This switch does not immediately separate its contacts ATS97 upon the deenergization of its coil, thereby maintaining coil ER96 of the exciter switch energized and thus the exciter in operation for a period sufficient to determine whether or not any calls remain to be answered. The exciter in turn maintains coil MRR254 of the motor-generator running switch relay energized, this relay in turn maintaining coil MR87 of the motor-generator running switch energized. Thus the motor generator set likewise is maintained in operation for a short time interval after the time switch TS drops out.

The engagement of contacts TS165 establishes a circuit through contacts 2DF186 for coil UR190 of the up direction switch relay. This causes reoperation of the time switch, the closing of the car gate and the starting of the car in the up direction as has been previously described.

Assuming no other buttons pressed, upon the arrival of the car at a predetermined distance from the second floor landing, up insulating roller 217 lifts second floor direction switch 181 off up cam section 167, breaking the circuit for coil UR190 of the up direction switch relay. This relay, upon dropping out, reengages contacts UR334, which establish a circuit through contacts SL324, contacts DR335 and contacts CP326 for restoring coil SL330 of the slow down switch. This effects the reset of the slow down switch, causing slow down of the car to be initiated. The car is thereafter further slowed down and finally brought to a stop at the second floor landing. It is believed that this will be understood from previous description. Upon reengagement of contacts FB220 just before the car reaches the second floor, a circuit is established for restoring coil 2DF184 of the down second floor relay through floor controller brush 211 and contact 175, causing this relay to be reset. The dropping out of switch FB also initiates opening of the car gate, causing the second floor hatchway door to be unlocked and the car gate opened as the car stopped at the second floor so that the intending passenger may enter the car.

It is believed to be understood without further detailed description that response is had to all push buttons regardless of the time or order in which the push buttons are pressed, since the contacts of the floor relays, once in engagement, are maintained so until released by reset operations. Stops are made in the natural order of floors even though the buttons are pressed out of said order. Car buttons cause the stopping of the car regardless of whether it is travelling in the up or down direction. As regards hall buttons, however, during up car travel the car stops in response to all up hall buttons and also stops in response to a down hall button provided no buttons remain unresponded to for floors above the floor corresponding to this down hall button. Similarly, during down car travel, the car stops in response to all down hall buttons, and also in response to an up hall button provided no buttons remain unresponded to for floors below the floor corresponding to this up hall button, contacts DR335 serving the same purpose in this operation as is served by contacts UR334 when a stop is made during up car travel in response to a down hall button.

The car is automatically started after each stop so long as push buttons remain to be responded to. The direction switch relays UR and DR act to maintain the car set for travel in the same direction after each stop so long as push buttons in that direction remain to be responded to at the time a call is picked up. The direction circuit is maintained through contacts MSR157, the direction switch relays acting to maintain the motor-generator starting switch relay MSR energized so long as such push buttons remain to be responded to. The direction relays also act through contacts MSR79 to maintain the "in operation" lights lighted so long as the car is maintained set for travel in the same direction. The circuit for coil SL311 of the slow down switch is made, upon reclosure of the hatchway door, through contacts TC316 of the time cancelling relay in restarting the car in the same direction without waiting on the expiration of the time interval of time switch TS. Thus, under such conditions, the car gate is closed immediately the hatchway door is closed and the car is started as the gate reaches closed position. Similarly, upon a passenger entering the car upon the last stop in either direction and pressing a car button for the opposite direction, with the hatchway door closed, the car gate is closed immediately and the car is started in the opposite direction as the gate reached closed position, the circuit for coil SL311 being established through contacts TC316 of the time cancelling relay without waiting on the expiration of the time interval of time switch TS. In case of the starting of the car in the opposite direction in response to a hall button, however, the car gate is not closed and the car is not started until the time interval of time switch TS has expired owing to the fact that the direction circuit through the hall button floor relay contacts, being subject to contacts TS165, cannot be made until these contacts reengage.

Contacts TS306 of the time switch, arranged in parallel with contacts TC316 of the time cancelling relay, are to prevent the immediate reclosure of the gate and starting of the car as it is brought to a stop under conditions where buttons remain to be responded to. This gives a passenger in the car time to open the gate and leave the car and an intending passenger at the floor time to open the door and enter the car. Until the door is opened, the time cancelling relay remains energized and contacts TC316 separated. Upon the opening of the door, coil TC105 of the time cancelling relay is deenergized and contacts TC316 engage. Thus, upon the reclosure of the door and consequent engagement of contacts DC290, the circuit for coil SL311 of the slow down switch is reestablished, provided the direction circuit is made so that contacts MSR304 are in engagement, and the gate is immediately closed and the car started. If the door is not opened, the reengagement of contacts TS306 upon the expiration of the time interval of the time switch causes the closing of the car gate and the restarting of the car provided the direction circuit is established.

If no calls are to be responded to upon the expiration of the time interval of the time switch TS and upon the further expiration of the additional time interval provided by the auxiliary time switch ATS, the separation of contacts ATS97 at the end of the combined time intervals breaks the circuit for coil ER96 of the exciter switch, contacts MSR94 being separated as a result of the breaking of the direction circuit as the last call was answered. The exciter switch ER, upon dropping out, separates contacts ER21 and ER22, breaking the circuit for the stator windings of the exciter driving motor 42, shutting down the exciter set. This deenergizes the minimum current shunt field switch MC, motor-generator running switch relay MRR and potential switch P. The separation of contacts MRR85 as a result of the deenergization of the motor-generator running switch relay breaks the circuit for coil MR87 of the motor-generator running switch. The motor-generator running switch MR, upon dropping out, separates contacts MR16, MR17 and MR20, disconnecting the stator windings of the generator driving motor 40 from the supply mains, shutting down the motor generator set.

When the car is being brought to a stop at a floor in response to a push button at that floor, the floor relay for that push button is reset upon the engagement of contacts FB220 and of the reset brush 206, 211 or 214 with its stationary contact for that floor relay. When more than one push button for a floor has been operated, the corresponding floor relays are all reset as the car comes to the floor. This includes resetting an operated down floor relay when a stop is made at the floor for which the relay is provided in response to the car button or up hall button or both for that floor during upward travel under conditions where buttons for floors above remain to be responded to. Similarly it includes resetting an operated up floor relay when a stop is made at the floor for which the relay is provided in response to the car button or down hall button or both for that floor during down car travel under conditions where buttons for floors below remain to be responded to. Thus, as regards hall buttons, double reset is had on a stop being made under conditions where both hall buttons at the floor have been pressed, regardless of the direction in which the car is travelling or whether buttons for floors beyond remain to be responded to.

Resistances 207, 212 and 213 are to provide the desired voltage for application to the restoring coils of the floor relays, separate resistances being utilized instead of a common resistance to insure the same voltage application when more than one floor relay is being reset at a time. Resistances 132, 150, 177 and 197 in the circuits for the contacts of the hall button floor relays which control the direction switch relays are provided to prevent undesirable operations as a result of unwanted circuits.

The voltage relay VR, in addition to controlling coil NR448 of the non-reversal switch, also, by its contacts VR345, controls the energization of coil FSR347 of the first slow down relay under short floor height conditions. Once relay FSR is energized in the starting operation, it establishes a self-holding circuit through contacts VR345. Thus, the early separation of contacts SL342 due to a short floor height does not effect the deenergization of relay FSR. This is not desired as the car would not attain sufficient speed and too much time would be consumed in making the run. By establishing a self-holding circuit for relay FSR subject to the voltage relay, the connection of the generator shunt field winding 414 across the generator armature in the starting operation is assured and a higher speed is attained, the actual value of the speed depending upon the voltage for which the voltage relay VR is set to operate. When the voltage relay VR operates it separates contacts VR345 and, if contacts SL 342 have already been opened, the first slow down relay FSR is deenergized, causing the connection of demagnetizing field winding 427 across the generator armature, thus initiating slow down of the car. Relay VR drops out when the generator voltage decreases to about twenty-five percent full speed value.

When a stop is made at a terminal floor, terminal stopping switches carried by the car are opened to insure the stop being made. During a stop at the upper terminal, up terminal stopping switches 337, 350, 361 and 283 are opened in the order named by a cam in the hatchway at the upper terminal. This insures the deenergization of first slow down relay FSR to reconnect the demagnetizing field winding 427 across the generator armature in series with resistance 416, the deenergization of the second slow down relay SSR to short-circuit resistance 416, the deenergization of fast and slow speed switch FS to disconnect the demagnetizing field winding 427 and shunt field winding 414 from across the generator armature, and finally the deenergization of the up direction switches and brake and field switches to disconnect the direction field winding from the exciter and to cause the application of the brake to bring the car to a stop. Down terminal stopping switches 343, 354, 373 and 320 are opened in the order named by a cam in the hatchway at the lower terminal upon a stop being made at the lower terminal floor, to insure the slow down and stopping operation as above described. Contacts U340, U351, UA362, D344, D355 and DA374 serve in effect as electrical interlocks to permit the energization of the coils of the switches which they control for travel in the opposite direction after a terminal stop is made.

In the event of an emergency, the car may be brought to a stop by opening emergency stop switch 255 in the car. This breaks the circuit for coil P261 of the potential switch, which drops out to separate contacts P267 and P390 and to reengage contacts P405. The separation of contacts P267 deenergizes all energized switches below these contacts in the wiring diagram of Figure 11, causing these switches to drop out. This results in the immediate disconnection of the shunt field winding 414 from across the generator armature and the connection of the demagnetizing field winding 427 across the generator armature. Contacts P405 short-circuit shunt field winding 414. This is to prevent too rapid slowing down of the car. The demagnetizing field has a low coefficient of self-induction so that it tends to vary rapidly as it is thrown across the generator armature. By short-circuiting shunt field winding 414, current is induced in this winding by the action of the demagnetizing field winding. In this way the coefficient of self-induction of the demagnetizing field winding is artificially increased, thereby lengthening the time constant of this field winding. This makes the effect of the demagnetizing field winding much less abrupt so that the slow down is not too sudden under emergency stop conditions.

The separation of contacts P261 also breaks the circuit for direction field winding 394 and brake release coil 403, the brake being applied to aid in bringing the car to a stop. Contacts P390 insure the disconnection of the brake release coil from across the direction field winding, thereby opening their mutual discharge circuit.

Contacts FB262 and LFB263 of the field and brake switches insure operation of the series field switch SF to short-circuit the series field winding under emergency stop conditions, thereby preventing the flow of high circulating current due to this winding. Contacts LFB263 are provided in series with contacts FB262 in the circuit for coil SF266 to prevent the operation of series field switch SF during the levelling period under normal operating conditions.

The non-reversal switch NR insures the establishment of the generator polarity in accordance with the direction in which the car is set to travel. It has previously been pointed out that contacts NR265 of this switch act to maintain series field switch SF operated upon starting until the proper polarity of the generator has been established. Contacts NR365 of this switch serve a similar purpose in that these contacts act to prevent the operation of fast and slow speed switch FS and thus the connection of the generator shunt field winding across the generator armature until the proper generator polarity has been established. Such operation is due to the action of the coils NR386 and NR448 of the non-reversal switch. These coils act cumulatively when the voltage of the generator is of the polarity which should be obtained for the direction in which the current is caused to flow in the direction field winding 394. Coil NR386 is connected in parallel with the direction field winding so that the current flow in this coil is determined by which direction switch is operated. Coil NR448 is connected across the generator armature so that the direction of current flow in this coil is determined by the polarity of the generator. Thus these coils act to assist or oppose each other, depending upon whether the polarity of the generator is in accordance with or opposite to the polarity which should be established by the connections for the direction field winding. Therefore, the operation of the non-reversal switch and thus the connection of the shunt field winding across the generator armature and rendering of the series field effective is prevented until the generator has built up to a certain value a voltage of a polarity in accordance with the direction of current supplied to the direction field winding.

Contacts NR307 of the non-reversal switch are provided to insure proper functioning of this switch. If, for any reason, switch NR should fail to fall out when a stop is made, contacts NR307 remain separated, thereby preventing the operation of slow down switch SL and thus the restarting of the car until the condition has been corrected.

Contacts FB443 of the field and brake switch are provided to insure the dropping out of voltage relay VR when a stop is made. If a quick stop were made, i. e., one in which the car was immediately restarted after being brought to a stop, without contacts FB443 the voltage relay might hold in. Thus contacts VR447 would remain separated, preventing the reoperation of the non-reversal switch. Thus contacts NR365 would remain separated so that the fast and slow speed switch FS could not operate to connect generator shunt field winding 414 across the generator armature and the car could not operate above slow speed. However, with coil VR445 subject to contacts FB443, its deenergization upon a stop being made is assured.

Contacts SL295 prevent the car being immediately started in the opposite direction upon coming to a stop, when the emergency stop switch 255 is opened during slow down for the last stop in the direction in which the car is travelling and then reclosed under conditions where a car button is pushed for a floor in such opposite direction. Without contacts SL295, as pawl magnet contacts PM293 remain in engagement under the assumed conditions, a circuit would be immediately established by contacts DR314 for the coils of the field and brake switch FB, down direction switch D and down auxiliary direction switch DA. These switches would operate to establish a circuit for the brake release coil 403 and direction field winding 394. This would cause a reversal of the generator polarity and the starting of the car in the down direction. Time switch contacts TS306 would be maintained open as the circuit for the time switch coil would be reestablished by contacts GR112 of the gate control relay, this relay being operated as a result of the engagement of contacts FB301. This would prevent the operation of slow down switch SL. Thus, the first slow down relay FSR would not operate, its contacts FSR364 remaining separated, preventing the operation of the fast and slow speed switch FS. Thus, the generator shunt field winding 414 would not be connected across the generator armature and the car would not run above slow speed. By making the coils of the direction switches subject to contacts SL295 of the slow down switch, the normal sequence of operation is insured as switches FB, D and DA cannot operate under the conditions assumed until the slow down switch SL is reoperated upon the expiration of the time interval of time switch TS.

The operation of any of the safety devices, the contacts of which are in circuit with coil P261 of the potential switch, causes the potential switch to drop out to bring the car to an emergency stop as above described. Should the gate be prematurely opened in the stopping operation, causing the deenergization of the direction switches and field and brake switch before the disconnection of the shunt field winding 414 and demagnetizing field winding 427, the reengagement of contacts U420 in the case of up car travel or of contacts D421 in the case of down car travel establishes another short-circuit for shunt field winding 414 to prevent too rapid an action of the demagnetizing field winding 427 as has been described for a stop in the up direction under emergency conditions.

Overload switches OA, OB and OC are provided to protect the system in the event of abnormal current flow in either the generator armature-motor armature circuit or in the circuit for the stator windings for the generator driving motor. Overload switches OA and OB have their coils OA14 and OB15 arranged in series with stator windings 24 and 26 respectively whereas overload switch OC has its coil OC438 in the generator armature-motor armature circuit. The contacts of these switches, OA64, OB65 and OC66, are arranged in the circuit from the secondary winding 67 of the operating transformer to the inlet terminals 75 and 78 of the rectifier. Thus, upon the operation of any one of the overload switches, the supply of power from the rectifier to control circuits is discontinued, causing the exciter set and the motor generator set to shut down as previously described.

The elevator control system above described has been chosen as a convenient one to illustrate the principles of the invention. The system illus- illustrated involves automatic slow down and stopping of the car to which the invention is particularly applicable, but it is to be understood that the invention is applicable to other forms of elevator control including those in which both the starting and stopping of the car is under manual control as in the case of car switch con- trolled elevators. Various refinements are included in the system illustrated in order that a full understanding of the principles of the invention as applied to a complete typical system may be obtained.

By way of review of the operation of the control system, to start the car the generator direction field winding is connected to an external source of current supply. The connection is such as to cause the current supplied to this winding to be in a direction to excite the generator for generating voltage for application to the hoisting motor of a polarity for starting the elevator car in the desired direction. When the generator voltage of the polarity desired reaches a certain value, the generator shunt field winding is connected across the generator armature. From this point on the generator builds up its voltage as a self-excited generator in the direction predetermined by the direction field winding. This provides a very smooth acceleration without accelerating switches.

To slow down the car, the generator demagnetizing field winding is connected across the generator armature, with connection of the generator shunt field winding across the generator armature maintained. The connection of the demagnetizing field winding is such that it opposes the shunt field winding. Thus the effect of the demagnetizing field winding is to neutralize the excitation due to the shunt field winding. This causes a gradual reduction of the generator voltage and thus smooth retardation of the car. Upon the generator voltage decreasing to a value about that which can be produced by the direction field winding, the demagnetizing field winding and shunt field winding are disconnected from the generator armature and the direction field winding is utilized to provide the generator excitation for the final slow speed operation. The direction field winding is disconnected in bringing the car to a stop.

Thus the direction field winding serves to establish a generator polarity in starting and to provide a low voltage for the final slow speed of the slow down operation. This field winding is preferably maintained energized all the time the elevator car is running. The shunt field winding acts to cause the generator to build up the voltage of the polarity established by the direction field winding to full value by self-excitation. The demagnetizing field serves to gradually reduce the generator voltage for retardation. Due to the close magnetic coupling between the shunt field winding and the demagnetizing field winding, the advantage of substantially the full time constant of both windings is obtained for the slow down operation.

The effect of the demagnetizing field is reduced during initial slow down. This is preferred, particularly where the shunt and demagnetizing field windings have a small time constant, to prevent too rapid initial retardation. Without this initial reduction, in case of a fast field, the retardation might be uncomfortable to occupants of the car.

The series field winding is utilized to compensate for load. This field winding is rendered effective in starting when the generator voltage of the desired polarity reaches a certain value. The series field winding is particularly useful for levelling. When levelling mechanism is provided, the direction field winding is utilized to excite the generator for the levelling operation, the invention being applicable to systems with or without levelling.

The series field winding is rendered effective for acceleration, full speed running and final slow speed during slow down for all loads. During the initial slow down, it is not effective unless the load on the elevator motor is above a certain value. As an aid to the series field winding, the strength of the shunt field winding is increased when the load on the elevator motor exceeds a certain value. To maintain the same relationship under such conditions, the strength of the demagnetizing field winding is correspondingly increased for the slow down operation. During idling, the series field winding is rendered ineffective and the demagnetizing field winding is connected across the generator armature so as to counteract the residual flux of the generator field. This reduces the generator circulating currents to a minimum. The connection of the shunt field winding across the generator armature in starting is prevented until the generator has established a voltage of a certain value of a polarity in accordance with the direction of flow of current in the direction field winding. Also, the series field winding is not rendered effective until the proper generator polarity has been definitely established.

The field windings have been illustrated as arranged for connection to a separately driven exciter as a source of current supply. It is to be understood that the exciter may be driven by the driving motor of the motor generator set. In case of direct current power supply to the building, the exciter may be omitted. Also the rectifier and its supply transformer may be omitted and the generator driven by a direct current driving motor in case of direct current power supply.

Many elevator control systems are very complex and admit of many variations. In applying the invention to such control systems, variations in the manner in which the excitation of the generator is controlled may be made with the view of adapting the invention more readily to such control systems. These and other changes in the manner of controlling the generator excitation may be made which do not depart from the spirit and scope of the invention. It is therefore intended that all matter contained in the above description or shown in the accompanying drawings shall be interpreted as illustrative and not in a limiting sense.

What is claimed is:

1. In combination; a source of current; a work motor; a generator for supplying current to said work motor, said generator having two field windings; means for connecting one of said field windings to said source to establish the polarity of said generator; and means operable upon the polarity of the voltage generated by said generator being definitely established for connecting the other of said field windings across the armature of said generator.

2. In combination; a source of current; a work motor; a generator for supplying current to said work motor, said generator having two field windings; means for connecting one of said field windings to said source to establish the polarity of said generator; and means responsive to the polarity and value of the voltage generated by said generator when excited by said one field winding for connecting the other of said field windings across the armature of said generator.

3. In combination; a source of direct current; a direct current work motor; a direct current generator for supplying current to said work motor, said generator having a separately excited field winding and a shunt field winding; means for connecting said separately excited field winding to said source to cause the generation of a voltage of a certain polarity; means for connecting said shunt field winding across the armature of said generator to cause said generator to build up to full voltage as a self-excited generator; and means for preventing the connection of said shunt field winding across the generator armature until the polarity of the generator in accordance with the excitation provided by said separately excited field winding has been definitely established.

4. In combination; a source of direct current; a direct current work motor; a direct current generator for supplying current to said work motor, said generator having a direction field winding and a shunt field winding; means for connecting said direction field winding to said source for current supply therefrom through such winding in either direction, thereby determining the polarity of the generator voltage, the amount of such excitation being sufficient to start said motor in a direction in accordance with the excitation of the generator by its direction field winding; means for connecting said shunt field winding across the armature of said generator to cause said generator to build up as a self-excited generator voltage of a polarity determined by the direction field winding, thereby accelerating the motor to full speed; and means for preventing the connection of said shunt field winding across the generator armature until generator voltage of a polarity in accordance with the direction of current supplied to said direction field winding has attained a certain value.

5. In combination; a source of direct current; a direct current work motor; a direct current generator for supplying current to said work motor, said generator having a direction field winding and a shunt field winding; means for connecting said direction field winding to said source for current supply therefrom through such winding in either direction, thereby determining the polarity of the generator voltage, the amount of such excitation being sufficient to start said motor in a direction in accordance with the excitation of the generator by its direction field winding; and means responsive to the polarity and value of the generator voltage for connecting said shunt field winding across the armature of said generator when the generator has attained a voltage of a certain value and of a polarity in accordance with the direction of current supply to said direction field winding to cause said generator to build up as a self-excited generator.

6. In a control system for an elevator car; a direct current motor for raising and lowering said car; a direct current generator for supplying current to said motor, said generator having a direction field winding and a shunt field winding; a source of direct current supply; means for connecting said direction field winding to said source for current supply therefrom in one direction to effect starting the car in the up direction; means for connecting said direction field winding to said source for current supply therefrom in the opposite direction to effect starting the car in the down direction; means for connecting said shunt field winding across the armature of said generator to cause said generator to build up as a self-excited generator voltage of a polarity determined by the direction field winding, thereby gradually bringing the car up to full speed; and means for preventing the connection of said shunt field winding across the generator armature until generator voltage of a polarity in accordance with the direction of current supplied to said direction field winding has attained a certain value.

7. In combination; a direct current work motor; a direct current generator for supplying current to said work motor, said generator having a direction field winding, a shunt field winding and a series field winding; a source of direct current supply; means for connecting said direction field winding to said source for current supply therefrom through such winding in either direction, thereby determining the polarity of the generator voltage; means for connecting said shunt field winding across the armature of said generator to cause said generator to build up as a self-excited generator voltage of a polarity determined by the direction field winding; and means for preventing the connection of said shunt field winding across the generator armature and for rendering said series field winding ineffective until generator voltage of a polarity in accordance with the direction of current supplied to said direction field winding has attained a certain value.

8. In a control system for an elevator car; a direct current motor for raising and lowering said car; a direct current generator for supplying current to said motor, said generator having a direction field winding, a shunt field winding and a series field winding; a source of direct current supply; means for connecting said direction field winding to said source for current supply therefrom in one direction to effect starting the car in the up direction; means for connecting said direction field winding to said source for current supply therefrom in the opposite direction to effect starting the car in the down direction; means for connecting said shunt field winding across the armature of said generator to cause said generator to build up as a self-excited generator voltage of a polarity determined by the direction field winding, thereby gradually bringing the car up to full speed; and means for preventing the connection of said shunt field winding across the generator armature and for short-circuiting said series field winding until generator voltage of a polarity in accordance with the direction of current supplied to said direction field winding has attained a certain value.

9. In a control system for an elevator car; a source of direct current supply; a direct current motor for raising and lowering said car; a direct current generator for suplying current to said motor, said generator having a separately excited field winding and a shunt field winding; means for connecting said separately excited field winding to said source to cause generation of a voltage to start the car; means for connecting said shunt field winding across the armature of said generator to cause said generator to build up to full value a voltage of a polarity determined by said separately excited field winding to bring the car up to full speed; and a relay for preventing the connection of said shunt field winding across the generator armature until generator voltage of the polarity determined by said separately excited field winding has attained a certain value, said relay having two operating coils, one connected in parallel with said separately excited field winding and the other across the generator armature so as to oppose each other except when the polarity of the generator voltage is in accordance with the direction of current supplied to said separately excited field winding.

10. In a control system for an elevator car; a source of direct current supply; a direct current motor for raising and lowering said car; a direct current generator for supplying current to said motor, the armatures of said generator and motor being permanently connected in a loop circuit, said generator having a series field winding connected in said loop circuit, a separately excited field winding capable when connected to said source of causing the generation of voltage by said generator sufficient to cause the car to run at slow speed, and a shunt field winding capable when connected across the generator armature of causing the generator to build up its voltage to full value to accelerate the car to full speed, said series field winding being short-circuited and said separately excited and shunt field windings being disconnected while the car is idle; means for connecting said separately excited field winding to said source for current supply therefrom in one direction to effect starting the car in the up direction; means for connecting said separately excited field winding to said source for current supply therefrom in the opposite direction to effect starting the car in the down direction; and means including a relay having two operating coils, one connected to said source and the other across the generator armature, which act to assist each other when the generator voltage is of a polarity in accordance with the direction of current supplied to said separately excited field winding and attains a certain value for removing the short circuit for the series field winding and for connecting said shunt field winding across the armature of said generator to cause said generator to build up voltage of a polarity determined by the separately excited field winding, thereby gradually bringing the car up to full speed.

11. In a control system for an elevator car; a source of direct current supply; a direct current motor for raising and lowering said car; a direct current generator for supplying current to said motor, the armatures of said generator and motor being permanently connected in a loop circuit, said generator having a series field winding connected in said loop circuit, a separately excited field winding capable when connected to said source of causing the generation of voltage by said generator sufficient to cause the car to run at slow speed, and a shunt field winding capable when connected across the generator armature of causing the generator to build up its voltage to full value to accelerate the car to full speed, said series field winding being short-circuited and said separately excited and shunt field windings being disconnected while the car is idle; means for connecting said separately excited field winding to said source for current supply therefrom in one direction to effect starting the car in the up direction; means for connecting said separately excited field winding to said source for current supply therefrom in the opposite direction to effect starting the car in the down direction; means for connecting said shunt field winding across the armature of said generator to cause said generator to build up voltage of a polarity determined by the separately excited field winding, thereby gradually bringing the car up to full speed; means for removing the short circuit from across the series field winding; and means including a relay having two operating coils, one connected to said source and the other across the generator armature, and acting to oppose each other except when the polarity of the generator voltage is in accordance with the direction of current supplied to said separately excited field winding for preventing the connection of said shunt field winding across the generator armature and the removal of the short circuit for the series field winding until generator voltage of the polarity determined by said separately excited field winding has attained a certain value.

12. In combination; a work motor; a generator for supplying current to said work motor; means for causing said generator to generate voltage for application to said motor; and means for decreasing the voltage of said generator by connecting two field windings of the generator across the generator armature so as to act in opposition.

13. In combination; a work motor; a generator for supplying current to said work motor, said generator having at least two field windings; means for causing said generator to generate voltage for application to said motor comprising means for connecting one field winding across the generator armature; and means for decreasing the generator voltage comprising means for connecting the other field winding across the generator armature in opposition to said one field winding.

14. In combination; a direct current work motor; a direct current generator for supplying current to said work motor, said generator having a shunt field winding and a demagnetizing field winding; means for connecting said shunt field winding across the generator armature to cause the generator to apply voltage to said motor for full speed operation; and means for connecting said demagnetizing field winding across the generator armature so as to oppose said shunt field winding to effect a gradual decrease in the value of the generator voltage, thereby slowing down the motor.

15. In combination; a direct current work motor; a direct current generator for supplying current to said work motor, said generator having two field windings; means for connecting one of said windings across the generator armature to cause the generator to apply voltage to said motor for full speed operation; and means for connecting the other field winding across the generator armature so as to oppose said one winding to effect a gradual decrease in the value of the generator voltage, thereby slowing down the motor, said last named means comprising means for limiting the current supplied to said demagnetizing field winding during the first part of said slow down.

16. In combination; a direct current work motor; a direct current generator for supplying current to said work motor, said generator having a shunt field winding and a demagnetizing field winding; means connecting said shunt field winding across the generator armature to cause the generator to apply voltage to said motor for full speed operation; and means for slowing down the motor to a slow speed, said means comprising means for connecting said demagnetizing field winding across the generator armature, while maintaining the connection of said shunt field winding across the generator armature, with the direction of current flow through the demagnetizing field winding such that it acts in opposition to said shunt field winding to effect a gradual decrease in the value of the generator voltage.

17. In combination; a direct current work motor; a direct current generator for supplying current to said work motor, said generator having a direction field winding, a shunt field winding and a demagnetizing field winding; means for connecting said shunt field winding across the generator armature to cause the generator to apply voltage to said motor for full speed operation; means for connecting said demagnetizing field winding across the generator armature so as to oppose said shunt field winding to effect a gradual decrease in the value of the generator voltage, thereby slowing down the motor; a source of direct current; and means for disconnecting said shunt and demagnetizing field windings from across the generator armature and for causing generator excitation for slow speed operation of said motor to be provided by said direction field winding connected to said source.

18. In combination; a source of direct current; a direct current work motor; and a direct current generator for supplying power to said work motor, said generator having a separately excited field winding for connection to said source to establish the polarity of the generator and start the motor and for providing a low voltage for the final slow speed of the motor during a slow down operation, a shunt field winding for connection across the generator armature when the polarity has been definitely established to cause the generator to build up as a self-excited generator to full voltage to bring the motor up to full speed, and a demagnetizing field winding adapted for connection across the generator armature while maintaining the connection of the shunt field winding across the generator armature to act in opposition to the shunt field winding so as to gradually decrease the generator voltage to reduce the speed of the motor to a slow speed.

19. In combination; a source of direct current supply; a direct current work motor; a direct current generator for supplying current to said motor, said generator having a direction field winding, a shunt field winding and a demagnetizing field winding; means for connecting said direction field winding to said source to establish the polarity of the generator and start the motor; means for connecting said shunt field winding across the armature of said generator to cause said generator to build up its voltage to full value to bring the motor up to full speed; means for connecting said demagnetizing field winding across the generator armature so as to oppose said shunt field winding to decrease the generator voltage to slow down the motor; and means for disconnecting said shunt and demagnetizing field windings from across the generator armature, said direction field winding being maintained connected to said source so that upon such disconnection it provides excitation for said generator for operating said motor at slow speed.

20. In combination; a source of direct current supply; a direct current work motor; a direct current generator for supplying current to said motor, said generator having a direction field winding, a shunt field winding and a demagnetizing field winding; means for connecting said direction field winding to said source to establish the polarity of the generator and start the motor; means for connecting said shunt field winding across the armature of said generator to cause said generator to build up its voltage to full value to bring the motor up to full speed; means for connecting said demagnetizing field winding across the generator armature so as to oppose said shunt field winding to decrease the generator voltage to slow down the motor; means for disconnecting said shunt and demagnetizing field windings from across the generator armature and for causing generator excitation for generating voltage for slow speed operation of the motor to be obtained from said separately excited field winding connected to said source; and means for bringing the car to a stop, said last named means comprising means for disconnecting said separately excited field winding from said source and for reconnecting said demagnetizing field winding across the generator armature.

21. In a control system for an elevator car; a source of direct current supply; a direct current motor for raising and lowering said car; a direct current generator for supplying current to said motor, said generator having a separately excited field winding, a shunt field winding and a demagnetizing field winding; means for connecting said separately excited field winding to said source to establish the polarity of said generator and start the car; means for connecting said shunt field winding across the armature of said generator to cause said generator gradually to build up its voltage to full value as a self-excited generator to bring the car up to full speed; and means for connecting said demagnetizing field winding across the generator armature so as to oppose said shunt field winding to effect a gradual decrease in the value of the generator voltage to slow down the car.

22. In a control system for an elevator car; a source of direct current supply; a direct current motor for raising and lowering said car; a direct current generator for supplying current to said motor, said generator having a separately excited field winding, a shunt field winding and a demagnetizing field winding; means for connecting said separately excited field winding to said source to cause generation of a voltage to start the car; means for connecting said shunt field winding across the armature of said generator to cause said generator gradually to build up its voltage to full value as a self-excited generator to bring the car up to full speed; means for connecting said demagnetizing field winding across the generator armature so as to oppose said shunt field winding to effect a gradual decrease in the value of the generator voltage to slow down the car; and means responsive to load on the work motor for increasing the excitation of said shunt field winding and for causing a corresponding increase in the effect of said demagnetizing field winding.

23. In a control system for an elevator car; a source of direct current supply; a direct current motor for raising and lowering said car; a direct current generator for supplying current to said motor, said generator having a separately excited field winding, a shunt field winding, and a demagnetizing field winding; means for connecting said separately excited field winding to said source to cause generation of a voltage to start the car; means for connecting said shunt field winding across the armature of said generator to cause said generator gradually to build up its voltage to full value as a self-excited generator to bring the car up to full speed; means for connecting said demagnetizing field winding across the generator armature so as to oppose said shunt field winding to effect a gradual decrease in the value of the generator voltage to slow down the car; means for disconnecting said shunt and demagnetizing field windings from across the generator armature when the generator voltage decreases to a low value and for causing generator excitation for slow speed operation of the car to be provided by said separately excited field winding connected to said source; and means for causing the voltage applied to said separately excited field winding by said source to be greater for starting the car than for slow speed operation.

24. In a control system for an elevator car; a source of direct current supply; a direct current motor for raising and lowering said car; a direct current generator for supplying current to said motor, said generator having a separately excited field winding, a shunt field winding and a demagnetizing field winding; means for connecting said separately excited field winding to said source to cause generation of a voltage to start the car; means for connecting said shunt field winding across the armature of said generator to cause said generator gradually to build up its voltage to full value as a self-excited generator to bring the car up to full speed; means for connecting said demagnetizing field winding across the generator armature so as to oppose said shunt field winding to effect a gradual decrease in the value of the generator voltage to slow down the car; means responsive to load on the work motor for increasing the excitation of said shunt field winding and for causing a corresponding increase in the effect of said demagnetizing field winding; and means for disconnecting said shunt and demagnetizing field windings from across the generator armature when the generator voltage decreases to a low value and for causing generator excitation for slow speed operation of the car to be provided by said separately excited field winding connected to said source.

25. In a control system for an elevator car; a source of direct current supply; a direct current motor for raising and lowering said car; a direct current generator for supplying current to said motor, said generator having a series field winding, a separately excited field winding, a shunt field winding and a demagnetizing field winding; means for connecting said separately excited field winding to said source to establish the polarity of the generator and to start the car; means operable upon the polarity of the generator voltage being definitely established for rendering said series field winding effective and for connecting said shunt field winding across the armature of said generator to cause said generator gradually to build up its voltage to full value as a self-excited generator to bring the car up to full speed; means for connecting said demagnetizing field winding across the generator armature so as to oppose said shunt field winding to effect a gradual decrease in the value of the generator voltage to slow down the car; means responsive to current supplied to the work motor during starting for increasing the excitation of said shunt field winding and for causing a corresponding increase in the effect of said demagnetizing field winding; means for rendering said series field winding ineffective during said slow down when said current responsive means has not been operated; means for disconnecting said shunt and demagnetizing field windings from across the generator armature when the generator voltage decreases to a low value and for causing generator excitation for slow speed operation of the car to be provided by said separately excited field winding connected to said source; and means for rendering said series field winding again effective for said slow speed operation of the car.

26. In combination; a source of direct current supply; a direct current work motor; a direct current generator for supplying current to said motor, said generator having a separately excited field winding, a shunt field winding and a demagnetizing field winding; means for connecting said separately excited field winding to said source to cause generation of a voltage to start the motor; means for connecting said shunt field winding across the armature of said generator to cause said generator gradually to build up its voltage to full value as a self-excited generator to bring the motor up to full speed; means for connecting said demagnetizing field winding across the generator armature so as to oppose said shunt field winding to effect a gradual decrease in the value of the generator voltage to slow down the motor, said shunt and demagnetizing field windings being of approximately the same strength; and means for disconnecting said shunt and demagnetizing field windings from across the generator armature, said separately excited field winding being connected to said source at the time such disconnection occurs to provide excitation for said generator for operating said motor at slow speed.

27. In a control system for an elevator car; a source of direct current supply; a direct current motor for raising and lowering said car; a direct current generator for supplying current to said motor, said generator having a separately excited field winding, a shunt field winding and a demagnetizing field winding; means for connecting said separately excited field winding to said source to cause generation of a voltage to start the car; means for connecting said shunt field winding across the armature of said generator to cause said generator gradually to build up its voltage to full value as a self-excited generator to bring the car up to full speed; means for connecting said demagnetizing field winding across the generator armature so as to oppose said shunt field winding to effect a gradual decrease in the value of the generator voltage to slow down the car; and means for disconnecting said shunt and demagnetizing field windings from across the generator armature to further decrease the generator voltage for a further reduction in speed of the car, said separately excited field winding being connected to said source at the time such disconnection occurs to provide excitation for said generator, the magnetizing force due to said shunt field winding being slightly greater than that due to the demagnetizing field winding at the time they are disconnected so that upon their disconnection a reduction in generator excitation takes place.

28. In a control system for an elevator car; a source of direct current supply; a direct current motor for raising and lowering said car; a direct current generator for supplying current to said motor, said generator having a separately excited field winding for connection to said source, a shunt field winding for connection across the generator armature, and a demagnetizing field winding also for connection across the generator armature; means for connecting said separately excited field winding to said source for current supply therefrom in one direction to cause generation of voltage of a polarity to start the car in the up direction; means for connecting said separately excited field winding to said source for current supply therefrom in the opposite direction to cause generation of voltage of a polarity to start the car in the down direction; means operable when the generator voltage of the polarity determined by said separately excited field winding has attained a certain value to connect said shunt field winding across the armature of said generator to cause said generator gradually to build up its voltage to full value, thereby bringing the car up to full speed; and means for slowing down the car, said last named means comprising means for connecting said demagnetizing field winding across the generator armature, while maintaining the connection of said shunt field winding across the generator armature, with the direction of current flow through the demagnetizing field winding such that it acts in opposition to said shunt field winding to effect a gradual decrease in the value of the generator voltage to bring the car down to a slow speed and means for disconnecting said shunt and demagnetizing field windings from across the generator armature and for causing generator excitation for slow speed operation of the car to be provided by said separately excited field winding connected to said source.

29. In a control system for an elevator car; a source of direct current supply; a direct current motor for raising and lowering said car; a direct current generator for supplying current to said motor, said generator having a separately excited field winding for connection to said source, a shunt field winding for connection across the generator armature, and a demagnetizing field winding also for connection across the generator armature; means for connecting said separately excited field winding to said source for current supply therefrom in one direction to cause generation of voltage of a polarity to start the car in the up direction; means for connecting said separately excited field winding to said source for current supply therefrom in the opposite direction to cause generation of voltage of a polarity to start the car in the down direction; means operable when the generator voltage of the polarity determined by said separately excited field winding has attained a certain value to connect said shunt field winding across the armature of said generator to cause said generator gradually to build up its voltage to full value, thereby bringing the car up to full speed; means for slowing down the car, said last named means comprising means for connecting said demagnetizing field winding across the generator armature, while maintaining the connection of said shunt field winding across the generator armature, with the direction of current flow through the demagnetizing field winding such that it acts in opposition to said shunt field winding to effect a gradual decrease in the value of the generator voltage to bring the car down to a slow speed and means for disconnecting said shunt and demagnetizing field windings from across the generator armature and for causing generator excitation for slow speed operation of the car to be provided by said separately excited field winding connected to said source; resistance in circuit with said shunt field winding; resistance in circuit with said demagnetizing field winding; means responsive to the load on the work motor during starting of the car for short-circuiting both of said resistances; and means for maintaining said resistances short-circuited until said shunt and demagnetizing field windings are disconnected from across the generator armature.

30. In a control system for an elevator car; a direct current motor for raising and lowering said car; a direct current generator for supplying current to said motor, said generator having a shunt field winding and a demagnetizing field winding; means connecting said shunt field winding across the generator armature to cause the generator to apply voltage to said motor for full speed operation of the car; and means for slowing down the car to a slow speed, said means comprising means operable when a normal stop is being made to connect said demagnetizing field winding across the generator armature while maintaining the connection of said shunt field winding across the generator armature, with the direction of current flow through the demagnetizing field winding such that it acts in opposition to said shunt field winding to effect a gradual decrease in the value of the generator voltage and means operable when an abnormal stop is being made to connect said demagnetizing field winding across the generator armature with the direction of current flow therethrough such that it acts to oppose the flux of the generator field and to disconnect said shunt field winding from across the generator armature and establish a discharge circuit for said shunt field winding so as to decrease the rate at which the generator voltage decreases.

31. In a control system for an elevator car; a source of direct current supply; a direct current motor for raising and lowering said car; a direct current generator for supplying current to said motor, said generator having a separately excited field winding, a shunt field winding and a demagnetizing field winding; means for connecting said separately excited field winding to said source to cause generation of voltage to start the car; means for connecting said shunt field winding across the armature of said generator to cause said generator gradually to build up its voltage to full value, thereby bringing the car up to full speed; and means actuated in accordance with car movement operable upon arrival of the car at a predetermined distance from a landing at which a stop is to be made for connecting said demagnetizing field winding across the generator armature so as to act in opposition to said shunt field winding to slow down the car.

32. In a control system for an elevator car; a source of direct current supply; a direct current motor for raising and lowering said car; a direct current generator for supplying current to said motor, said generator having a separately excited field winding, a shunt field winding and a demagnetizing field winding; means for connecting said separately excited field winding to said source to cause generation of voltage to start the car; means for connecting said shunt field winding across the armature of said generator to cause said generator gradually to build up its voltage to full value, thereby bringing the car up to full speed; and means actuated in accordance with car movement operable upon arrival of the car at a predetermined distance from a landing at which a stop is to be made for connecting said demagnetizing field winding across the generator armature so as to act in opposition to said shunt field winding to slow down the car and operable upon arrival of the car at a point still closer to the landing for disconnecting said shunt and demagnetizing field windings and for causing generator excitation for slow speed operation of the car to be provided by said separately excited field winding connected to said source.

33. In a control system for an elevator car; a source of direct current supply; a direct current motor for raising and lowering said car; a direct current generator for supplying current to said motor, said generator having a separately excited field winding, a shunt field winding and a demagnetizing field winding; means for connecting said separately excited field winding to said source for current supply therefrom to cause generation of voltage of a polarity to start the car in either direction; means operable when the generator voltage of the polarity determined by said separately excited field winding has attained a certain value to connect said shunt field winding across the armature of said generator to cause said generator gradually to build up its voltage to full value, thereby bringing the car up to full speed; means operable automatically upon arrival of the car at a predetermined distance from a landing at which a stop is to be made for initiating slow down of the car, said means comprising means for connecting said demagnetizing field winding across the generator armature while maintaining the connection of said shunt field winding across the generator armature with the direction of current flow through the demagnetizing field winding such that it acts in opposition to said shunt field winding to effect a gradual decrease in the value of generator voltage; and means operable automatically upon arrival of the car at a point still closer to the landing for disconnecting said shunt and demagnetizing field windings and for causing generator excitation for slow speed operation of the car to be provided by said separately excited field winding connected to said source.

34. In a control system for an elevator car; a source of direct current supply; a direct current motor for raising and lowering said car; a direct current generator for supplying current to said motor, said generator having a separately excited field winding and a shunt field winding; means for connecting said separately excited field winding to said source to cause generation of a voltage to start the car; means for connecting said shunt field winding across the armature of said generator to cause said generator to build up to full value a voltage of a polarity determined by said separately excited field winding to bring the car up to full speed; means for decreasing the generator voltage to slow down the car preparatory to bringing it to a stop at a landing; and means for bringing the car to a level with the landing at which a stop is being made, regardless of whether the car underruns or overruns the landing, with generator excitation provided by said separately excited field winding connected to said source.

JACOB DANIEL LEWIS.
HAROLD WATERS.
OTTO ALBERT KRAUER.